(12) United States Patent
Bellman et al.

(10) Patent No.: US 11,097,509 B2
(45) Date of Patent: Aug. 24, 2021

(54) SILOXANE PLASMA POLYMERS FOR SHEET BONDING

(71) Applicant: CORNING INCORPORATED, Corning, NY (US)

(72) Inventors: Robert Alan Bellman, Ithaca, NY (US); Jiangwei Feng, Painted Post, NY (US); Prantik Mazumder, Ithaca, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 16/327,497

(22) PCT Filed: Aug. 29, 2017

(86) PCT No.: PCT/US2017/049019
§ 371 (c)(1),
(2) Date: Feb. 22, 2019

(87) PCT Pub. No.: WO2018/044837
PCT Pub. Date: Mar. 8, 2018

(65) Prior Publication Data
US 2019/0176435 A1    Jun. 13, 2019

Related U.S. Application Data

(60) Provisional application No. 62/381,124, filed on Aug. 30, 2016.

(51) Int. Cl.
*B32B 7/12* (2006.01)
*C09J 183/04* (2006.01)
(Continued)

(52) U.S. Cl.
CPC ............. *B32B 7/12* (2013.01); *B32B 7/06* (2013.01); *B32B 9/005* (2013.01); *B32B 9/04* (2013.01);
(Continued)

(58) Field of Classification Search
CPC ........ B32B 15/04; B32B 17/06; B32B 17/061; B32B 2037/246; B32B 2255/00;
(Continued)

(56) References Cited

U.S. PATENT DOCUMENTS 3,722,181 A    3/1973 Kirkland et al.
4,096,315 A    6/1978 Kubacki
(Continued)

FOREIGN PATENT DOCUMENTS

CN    101924067 A    12/2010
CN    102034746 A    4/2011
(Continued)

OTHER PUBLICATIONS

Mazumder et al (WO 2015-112958), Jul. 30, 2015.*
(Continued)

*Primary Examiner* — Lawrence D Ferguson

(57) ABSTRACT

Described herein are glass articles and methods of making glass articles, comprising a thin sheet and a carrier, wherein the thin sheet and carrier or bonded together using a coating layer, which is preferably an organosiloxane polymer coating layer, and associated deposition methods and inert gas treatments that may be applied on the thin sheet, the carrier, or both, to control van der Waals, hydrogen and covalent bonding between the thin sheet and the carrier. The coating layer bonds the thin sheet and carrier together to prevent a permanent bond at high temperature processing while at the same time maintaining a sufficient bond to prevent delamination during high temperature processing.

18 Claims, 7 Drawing Sheets

(51) Int. Cl.
*B32B 9/04* (2006.01)
*B32B 9/00* (2006.01)
*B32B 17/06* (2006.01)
*B32B 15/04* (2006.01)
*B32B 7/06* (2019.01)
*C09D 183/08* (2006.01)
*C09D 183/00* (2006.01)
*C09D 183/04* (2006.01)
*B32B 27/28* (2006.01)
*B32B 37/24* (2006.01)
*C09J 5/04* (2006.01)
*C08G 77/26* (2006.01)
*C08G 77/04* (2006.01)

(52) U.S. Cl.
CPC ............ *B32B 9/041* (2013.01); *B32B 15/04* (2013.01); *B32B 17/06* (2013.01); *B32B 17/061* (2013.01); *B32B 27/283* (2013.01); *B32B 37/24* (2013.01); *C09D 183/00* (2013.01); *C09D 183/04* (2013.01); *C09D 183/08* (2013.01); *C09J 5/04* (2013.01); *C09J 183/04* (2013.01); *B32B 2037/246* (2013.01); *B32B 2255/00* (2013.01); *B32B 2255/06* (2013.01); *B32B 2255/26* (2013.01); *B32B 2255/28* (2013.01); *B32B 2307/712* (2013.01); *B32B 2307/732* (2013.01); *B32B 2307/748* (2013.01); *B32B 2309/105* (2013.01); *B32B 2383/00* (2013.01); *B32B 2457/14* (2013.01); *B32B 2457/20* (2013.01); *C08G 77/04* (2013.01); *C08G 77/26* (2013.01)

(58) Field of Classification Search
CPC ............ B32B 2255/06; B32B 2255/26; B32B 2255/28; B32B 2307/712; B32B 2307/732; B32B 2307/748; B32B 2309/105; B32B 2383/00; B32B 2457/14; B32B 2457/20; B32B 27/283; B32B 37/24; B32B 7/06; B32B 7/12; B32B 9/005; B32B 9/04; B32B 9/041; C08G 77/04; C08G 77/26; C09D 183/00; C09D 183/04; C09D 183/08; C09J 183/04; C09J 5/04
See application file for complete search history.

(56) References Cited

U.S. PATENT DOCUMENTS

| | | |
|---|---|---|
| 4,179,324 A | 12/1979 | Kirkpatrick |
| 4,397,722 A | 8/1983 | Haller |
| 4,599,243 A | 7/1986 | Sachdev et al. |
| 4,810,326 A | 3/1989 | Babu et al. |
| 4,822,466 A | 4/1989 | Rabalais et al. |
| 4,849,284 A | 7/1989 | Arthur et al. |
| 4,990,462 A | 2/1991 | Sliwa, Jr. |
| 5,073,181 A | 12/1991 | Foster et al. |
| 5,141,800 A | 8/1992 | Effenberger et al. |
| 5,222,494 A | 6/1993 | Baker, Jr. |
| 5,357,726 A | 10/1994 | Effenberger et al. |
| 5,413,940 A | 5/1995 | Lin et al. |
| 5,462,781 A | 10/1995 | Zukowski |
| 5,479,043 A | 12/1995 | Nuyen |
| 5,482,896 A | 1/1996 | Tang |
| 5,491,571 A | 2/1996 | Williams et al. |
| 5,554,680 A | 9/1996 | Ojakaar |
| 5,616,179 A | 4/1997 | Baldwin et al. |
| 5,661,618 A | 8/1997 | Brown et al. |
| 5,718,967 A | 2/1998 | Hu et al. |
| 5,755,867 A | 5/1998 | Chikuni et al. |
| 5,820,991 A | 10/1998 | Cabo |
| 5,840,616 A | 11/1998 | Sakaguchi et al. |
| 5,888,591 A | 3/1999 | Gleason et al. |
| 5,904,791 A | 5/1999 | Bearinger et al. |
| 5,966,622 A | 10/1999 | Levine et al. |
| 5,972,152 A | 10/1999 | Lake et al. |
| 6,037,026 A | 3/2000 | Iwamoto |
| 6,091,478 A | 7/2000 | Tanaka et al. |
| 6,124,154 A | 9/2000 | Miyasaka |
| 6,159,385 A | 12/2000 | Yao et al. |
| 6,261,398 B1 | 7/2001 | Costa |
| 6,338,901 B1 | 1/2002 | Veerasamy |
| 6,379,746 B1 | 4/2002 | Birch et al. |
| 6,387,736 B1 | 5/2002 | Cao et al. |
| 6,521,511 B1 | 2/2003 | Inoue et al. |
| 6,521,857 B1 | 2/2003 | Barnett |
| 6,528,145 B1 | 3/2003 | Berger et al. |
| 6,540,866 B1 | 4/2003 | Zhang et al. |
| 6,602,606 B1 | 8/2003 | Fujisawa et al. |
| 6,645,828 B1 | 11/2003 | Farrens et al. |
| 6,649,540 B2 | 11/2003 | Wang et al. |
| 6,687,969 B1 | 2/2004 | Dando |
| 6,699,798 B2 | 3/2004 | Rockford |
| 6,735,982 B2 | 5/2004 | Matthies |
| 6,762,074 B1 | 7/2004 | Draney et al. |
| 6,814,833 B2 | 11/2004 | Sabia |
| 6,815,070 B1 | 11/2004 | Burkle et al. |
| 6,969,166 B2 | 11/2005 | Clark et al. |
| 6,974,731 B2 | 12/2005 | Yamazaki et al. |
| 6,992,371 B2 | 1/2006 | Mancini et al. |
| 7,041,608 B2 | 5/2006 | Sieber et al. |
| 7,045,878 B2 | 5/2006 | Faris |
| 7,056,751 B2 | 6/2006 | Faris |
| 7,060,323 B2 | 6/2006 | Sugahara et al. |
| 7,118,990 B1 | 10/2006 | Xu et al. |
| 7,129,311 B2 | 10/2006 | Teff et al. |
| 7,144,638 B2 | 12/2006 | Leung et al. |
| 7,147,740 B2 | 12/2006 | Takayama et al. |
| 7,166,520 B1 | 1/2007 | Henley |
| 7,220,656 B2 | 5/2007 | Forbes |
| 7,232,739 B2 | 6/2007 | Kerdiles et al. |
| 7,261,793 B2 | 8/2007 | Chen et al. |
| 7,351,300 B2 | 4/2008 | Takayama et al. |
| 7,364,942 B2 | 4/2008 | Martin |
| 7,407,867 B2 | 8/2008 | Ghyselen et al. |
| 7,408,006 B2 | 8/2008 | Comino et al. |
| 7,466,390 B2 | 12/2008 | French et al. |
| 7,482,249 B2 | 1/2009 | Jakob et al. |
| 7,531,590 B2 | 5/2009 | Teff et al. |
| 7,541,264 B2 | 6/2009 | Gardner et al. |
| 7,574,787 B2 | 8/2009 | Xu et al. |
| 7,575,983 B2 | 8/2009 | Hu et al. |
| 7,635,617 B2 | 12/2009 | Yamazaki |
| 7,642,559 B2 | 1/2010 | Yamazaki et al. |
| 7,737,035 B1 | 6/2010 | Lind et al. |
| 7,741,775 B2 | 6/2010 | Yamazaki et al. |
| 7,749,862 B2 | 7/2010 | Schwarzenbach et al. |
| 7,763,365 B2 | 7/2010 | Takeuchi et al. |
| 7,842,548 B2 | 11/2010 | Lee et al. |
| 7,902,038 B2 | 3/2011 | Aspar et al. |
| 7,909,928 B2 | 3/2011 | Lahann et al. |
| 7,939,425 B2 | 5/2011 | Hu et al. |
| 7,960,840 B2 | 6/2011 | Bonifield et al. |
| 7,960,916 B2 | 6/2011 | Kawachi |
| 7,978,282 B2 | 7/2011 | An et al. |
| 7,989,314 B2 | 8/2011 | Lee et al. |
| 8,012,667 B2 | 9/2011 | Nam et al. |
| 8,034,206 B2 | 10/2011 | Kim et al. |
| 8,034,452 B2 | 10/2011 | Padiyath et al. |
| 8,043,697 B2 | 10/2011 | Murakami et al. |
| 8,048,794 B2 | 11/2011 | Knickerbocker |
| 8,069,229 B2 | 11/2011 | Yellapragada et al. |
| 8,105,935 B2 | 1/2012 | Ohara et al. |
| 8,138,614 B2 | 3/2012 | Yamazaki et al. |
| 8,173,249 B2 | 5/2012 | Leu et al. |
| 8,211,259 B2 | 7/2012 | Sato et al. |
| 8,211,270 B2 | 7/2012 | Suzuki et al. |
| 8,236,669 B2 | 8/2012 | Hong et al. |
| 8,268,939 B2 | 9/2012 | Ebbrecht et al. |
| 8,349,727 B2 | 1/2013 | Guo et al. |
| 8,383,460 B1 | 2/2013 | Yim |

(56) References Cited

U.S. PATENT DOCUMENTS

| | | |
|---|---|---|
| 8,399,047 B2 | 3/2013 | Lahann et al. |
| 8,580,069 B2 | 11/2013 | Watanabe et al. |
| 8,590,688 B2 | 11/2013 | Weigl |
| 8,609,229 B2 | 12/2013 | Kondo |
| 8,656,735 B2 | 2/2014 | Tamitsuji et al. |
| 8,660,052 B2 | 2/2014 | Liang et al. |
| 8,697,228 B2 | 4/2014 | Carre et al. |
| 8,697,728 B2 | 4/2014 | Ashrafian et al. |
| 8,822,306 B2 | 9/2014 | Berger et al. |
| 8,840,999 B2 | 9/2014 | Harimoto et al. |
| 8,993,706 B2 | 3/2015 | Schubert et al. |
| 8,995,146 B2 | 3/2015 | Brooks et al. |
| 9,069,133 B2 | 6/2015 | Baldwin et al. |
| 9,111,981 B2 | 8/2015 | Flaim et al. |
| 9,131,587 B2 | 9/2015 | Zhou |
| 9,269,826 B2 | 2/2016 | Hosono et al. |
| 9,612,455 B2 | 4/2017 | Nicolson et al. |
| 9,805,941 B2 | 10/2017 | Kanarik et al. |
| 9,889,635 B2 | 2/2018 | Bellman et al. |
| 10,046,542 B2 | 8/2018 | Adib et al. |
| 10,086,584 B2 | 10/2018 | Bellman et al. |
| 10,543,662 B2 | 1/2020 | Bellman et al. |
| 2001/0045351 A1 | 11/2001 | Koh et al. |
| 2002/0171080 A1 | 11/2002 | Faris |
| 2003/0017303 A1 | 1/2003 | Shindo et al. |
| 2003/0020049 A1 | 1/2003 | Payne et al. |
| 2003/0020062 A1 | 1/2003 | Faris |
| 2003/0057563 A1 | 3/2003 | Nathan et al. |
| 2003/0119336 A1 | 6/2003 | Matsuki et al. |
| 2003/0175525 A1 | 9/2003 | Wochnowski et al. |
| 2003/0210853 A1 | 11/2003 | Kato |
| 2003/0228413 A1 | 12/2003 | Ohta et al. |
| 2004/0033358 A1 | 2/2004 | Coates et al. |
| 2004/0044100 A1 | 3/2004 | Schlenoff et al. |
| 2004/0217352 A1 | 11/2004 | Forbes |
| 2004/0222500 A1 | 11/2004 | Aspar et al. |
| 2004/0247949 A1 | 12/2004 | Akedo et al. |
| 2004/0248378 A1 | 12/2004 | Ghyselen et al. |
| 2004/0258850 A1 | 12/2004 | Straccia et al. |
| 2005/0001201 A1 | 1/2005 | Bocko et al. |
| 2005/0029224 A1 | 2/2005 | Aspar et al. |
| 2005/0059218 A1 | 3/2005 | Faris |
| 2005/0069713 A1 | 3/2005 | Gupta et al. |
| 2005/0081993 A1 | 4/2005 | Ilkka et al. |
| 2005/0118595 A1 | 6/2005 | Lahann |
| 2005/0118742 A1 | 6/2005 | Henning et al. |
| 2005/0136188 A1 | 6/2005 | Chris |
| 2005/0175851 A1 | 8/2005 | Bordunov et al. |
| 2005/0224155 A1 | 10/2005 | Chen et al. |
| 2005/0242341 A1 | 11/2005 | Knudson et al. |
| 2006/0091104 A1 | 5/2006 | Takeshita et al. |
| 2006/0134362 A1 | 6/2006 | Lu et al. |
| 2006/0165975 A1 | 7/2006 | Moser et al. |
| 2006/0166464 A1 | 7/2006 | Jakob et al. |
| 2006/0192205 A1 | 8/2006 | Yamazaki et al. |
| 2006/0246218 A1 | 11/2006 | Bienkiewicz et al. |
| 2006/0250559 A1 | 11/2006 | Bocko et al. |
| 2006/0264004 A1 | 11/2006 | Tong et al. |
| 2007/0048530 A1 | 3/2007 | Tsao et al. |
| 2007/0077353 A1 | 4/2007 | Lee et al. |
| 2007/0077728 A1 | 4/2007 | Kulkarni et al. |
| 2007/0077782 A1 | 4/2007 | Lee et al. |
| 2007/0091062 A1 | 4/2007 | French et al. |
| 2007/0105252 A1 | 5/2007 | Lee et al. |
| 2007/0105339 A1 | 5/2007 | Faris |
| 2007/0111391 A1 | 5/2007 | Aoki et al. |
| 2007/0134784 A1 | 6/2007 | Halverson et al. |
| 2007/0181938 A1 | 8/2007 | Bucher et al. |
| 2007/0248809 A1 | 10/2007 | Haldeman et al. |
| 2008/0044588 A1 | 2/2008 | Sakhrani |
| 2008/0053959 A1 | 3/2008 | Tong et al. |
| 2008/0090380 A1 | 4/2008 | Gardner et al. |
| 2008/0111786 A1 | 5/2008 | Goudarzi |
| 2008/0135175 A1 | 6/2008 | Higuchi |
| 2008/0173992 A1 | 7/2008 | Mahler et al. |
| 2008/0212000 A1 | 9/2008 | French et al. |
| 2008/0309867 A1 | 12/2008 | Kampstra |
| 2009/0020414 A1 | 1/2009 | Tsao et al. |
| 2009/0091025 A1 | 4/2009 | Wong et al. |
| 2009/0110882 A1 | 4/2009 | Higuchi |
| 2009/0126404 A1 | 5/2009 | Sakhrani et al. |
| 2009/0133820 A1 | 5/2009 | Sato et al. |
| 2009/0218560 A1 | 9/2009 | Flaim et al. |
| 2009/0227074 A1 | 9/2009 | Hong et al. |
| 2009/0261062 A1 | 10/2009 | Kim |
| 2009/0262294 A9 | 10/2009 | Templier et al. |
| 2009/0266471 A1 | 10/2009 | Kim et al. |
| 2009/0321005 A1 | 12/2009 | Higuchi et al. |
| 2010/0018505 A1 | 1/2010 | Ma et al. |
| 2010/0038023 A1 | 2/2010 | Kho et al. |
| 2010/0089096 A1 | 4/2010 | Tamitsuji et al. |
| 2010/0101719 A1 | 4/2010 | Otsuka et al. |
| 2010/0151231 A1 | 6/2010 | Matsuo et al. |
| 2010/0187980 A1 | 7/2010 | Langer et al. |
| 2010/0224320 A1 | 9/2010 | Tsai et al. |
| 2010/0308014 A1 | 12/2010 | Alan |
| 2010/0316871 A1 | 12/2010 | Fujiwara et al. |
| 2011/0001251 A1 | 1/2011 | Gou et al. |
| 2011/0002636 A1 | 1/2011 | Ando et al. |
| 2011/0010905 A1 | 1/2011 | Sturzebecher |
| 2011/0012873 A1 | 1/2011 | Prest et al. |
| 2011/0024166 A1 | 2/2011 | Chang et al. |
| 2011/0026236 A1 | 2/2011 | Kondo et al. |
| 2011/0042649 A1 | 2/2011 | Duvall et al. |
| 2011/0045239 A1 | 2/2011 | Takaya et al. |
| 2011/0048611 A1 | 3/2011 | Carre et al. |
| 2011/0064953 A1 | 3/2011 | O'Rourke et al. |
| 2011/0069467 A1 | 3/2011 | Flaim et al. |
| 2011/0092006 A1 | 4/2011 | An et al. |
| 2011/0102346 A1 | 5/2011 | Orsley et al. |
| 2011/0111194 A1 | 5/2011 | Carre et al. |
| 2011/0123787 A1 | 5/2011 | Tomamoto et al. |
| 2011/0170991 A1 | 7/2011 | Weigl |
| 2011/0207328 A1 | 8/2011 | Speakman |
| 2011/0227086 A1 | 9/2011 | French |
| 2011/0250427 A1 | 10/2011 | Kotov et al. |
| 2011/0256385 A1 | 10/2011 | Matsuzaki et al. |
| 2011/0272090 A1 | 11/2011 | Higuchi |
| 2011/0304794 A1 | 12/2011 | Noh et al. |
| 2011/0308739 A1 | 12/2011 | McCutcheon et al. |
| 2011/0311789 A1 | 12/2011 | Loy et al. |
| 2011/0318544 A1 | 12/2011 | Chen et al. |
| 2011/0318589 A1 | 12/2011 | Pignatelli et al. |
| 2012/0009703 A1 | 1/2012 | Feinstein et al. |
| 2012/0034437 A1 | 2/2012 | Puligadda et al. |
| 2012/0035309 A1 | 2/2012 | Zhu et al. |
| 2012/0045611 A1 | 2/2012 | Shih et al. |
| 2012/0052654 A1 | 3/2012 | Yang et al. |
| 2012/0061881 A1 | 3/2012 | Bae et al. |
| 2012/0063952 A1 | 3/2012 | Hong et al. |
| 2012/0080403 A1 | 4/2012 | Tomamoto et al. |
| 2012/0083098 A1 | 4/2012 | Berger et al. |
| 2012/0107978 A1 | 5/2012 | Shin et al. |
| 2012/0118478 A1 | 5/2012 | Park et al. |
| 2012/0132885 A1 | 5/2012 | Lippert et al. |
| 2012/0135187 A1 | 5/2012 | Takimoto et al. |
| 2012/0153496 A1 | 6/2012 | Lee et al. |
| 2012/0156457 A1 | 6/2012 | Kondo |
| 2012/0156480 A1 | 6/2012 | Kondo et al. |
| 2012/0171454 A1 | 7/2012 | Kondo |
| 2012/0193029 A1 | 8/2012 | Fay et al. |
| 2012/0202010 A1 | 8/2012 | Uchida |
| 2012/0202030 A1 | 8/2012 | Kondo et al. |
| 2012/0223049 A1 | 9/2012 | Yoshikawa et al. |
| 2012/0228617 A1 | 9/2012 | Ko et al. |
| 2012/0235315 A1 | 9/2012 | Wu et al. |
| 2012/0258320 A1 | 10/2012 | Berger |
| 2012/0272800 A1 | 11/2012 | Lacan et al. |
| 2012/0276689 A1 | 11/2012 | Canale et al. |
| 2012/0315470 A1 | 12/2012 | Hanaki et al. |
| 2012/0329249 A1 | 12/2012 | Ahn et al. |
| 2013/0037960 A1 | 2/2013 | Sadaka et al. |
| 2013/0115441 A1 | 5/2013 | Bookbinder et al. |
| 2013/0188324 A1 | 7/2013 | Lee et al. |

(56) References Cited

U.S. PATENT DOCUMENTS

| | | |
|---|---|---|
| 2013/0192574 A1 | 8/2013 | Maeda |
| 2013/0192754 A1 | 8/2013 | Dukkipati et al. |
| 2013/0203265 A1 | 8/2013 | Hsiao |
| 2013/0209731 A1 | 8/2013 | Nattermann et al. |
| 2013/0230265 A1 | 9/2013 | Hubbard et al. |
| 2013/0239617 A1 | 9/2013 | Dannoux |
| 2013/0270533 A1 | 10/2013 | Crispin et al. |
| 2013/0280495 A1 | 10/2013 | Matsumoto |
| 2014/0050911 A1 | 2/2014 | Mauro et al. |
| 2014/0106141 A1 | 4/2014 | Bellman et al. |
| 2014/0106150 A1 | 4/2014 | Decker et al. |
| 2014/0130969 A1 | 5/2014 | McCutcheon et al. |
| 2014/0150244 A1 | 6/2014 | Liu et al. |
| 2014/0165654 A1 | 6/2014 | Bellman et al. |
| 2014/0166199 A1 | 6/2014 | Bellman et al. |
| 2014/0170378 A1 | 6/2014 | Bellman et al. |
| 2014/0210075 A1 | 7/2014 | Lee et al. |
| 2014/0220327 A1 | 8/2014 | Adib et al. |
| 2014/0295590 A1 | 10/2014 | Oh et al. |
| 2015/0060869 A1 | 3/2015 | Ro et al. |
| 2015/0060870 A1 | 3/2015 | Ro et al. |
| 2015/0086794 A1 | 3/2015 | Akita et al. |
| 2015/0099110 A1 | 4/2015 | Bellman et al. |
| 2015/0102498 A1 | 4/2015 | Enicks et al. |
| 2015/0266276 A1 | 9/2015 | Vissing et al. |
| 2015/0306847 A1 | 10/2015 | Bellman et al. |
| 2015/0329415 A1 | 11/2015 | Bellman et al. |
| 2016/0009958 A1 | 1/2016 | Moore et al. |
| 2016/0017196 A1 | 1/2016 | Moore et al. |
| 2016/0035764 A1 | 2/2016 | Watts |
| 2016/0083835 A1 | 3/2016 | Adib et al. |
| 2016/0211803 A1 | 7/2016 | Ji et al. |
| 2016/0329415 A1 | 11/2016 | He et al. |
| 2017/0036419 A1 | 2/2017 | Adib et al. |
| 2017/0182744 A1 | 6/2017 | Bellman et al. |
| 2017/0320771 A1 | 11/2017 | Adib et al. |
| 2018/0126705 A1 | 5/2018 | Adib et al. |
| 2018/0269071 A1 | 9/2018 | Le et al. |
| 2018/0297324 A1 | 10/2018 | Adib et al. |

FOREIGN PATENT DOCUMENTS

| | | |
|---|---|---|
| CN | 102070120 B | 9/2012 |
| CN | 101916022 B | 10/2012 |
| CN | 102789125 A | 11/2012 |
| CN | 102820262 A | 12/2012 |
| CN | 103042803 A | 4/2013 |
| CN | 102815052 B | 8/2016 |
| DE | 10034737 A1 | 2/2002 |
| DE | 10323303 A1 | 4/2004 |
| DE | 10323304 A1 | 4/2004 |
| DE | 10353530 A1 | 6/2005 |
| EP | 0737258 A1 | 10/1996 |
| EP | 1628339 A1 | 2/2006 |
| EP | 1914066 A1 | 4/2008 |
| EP | 2025650 A1 | 2/2009 |
| EP | 2128105 A1 | 12/2009 |
| EP | 2270865 A2 | 1/2011 |
| EP | 2273475 A1 | 1/2011 |
| EP | 2398040 A1 | 12/2011 |
| EP | 2331436 B1 | 12/2012 |
| FR | 2893750 A1 | 5/2007 |
| GB | 1082116 A | 9/1967 |
| GB | 1373359 A | 11/1974 |
| GB | 1373359 A | 11/1974 |
| GB | 1583544 A | 1/1981 |
| GB | 2481187 A | 12/2011 |
| IN | 200906585 P1 | 5/2012 |
| JP | 1993096235 A | 4/1993 |
| JP | 05-111620 | 5/1993 |
| JP | 2000241804 A | 9/2000 |
| JP | 2002348150 A | 12/2002 |
| JP | 2003071937 A | 3/2003 |
| JP | 2003077187 A | 3/2003 |
| JP | 2004-066664 A | 3/2004 |
| JP | 2004178891 A | 6/2004 |
| JP | 2005014599 A | 1/2005 |
| JP | 2005300972 A | 10/2005 |
| JP | 2006003684 A | 1/2006 |
| JP | 2007138144 A | 6/2007 |
| JP | 4036018 B2 | 1/2008 |
| JP | 2008072087 A | 3/2008 |
| JP | 2008123948 A | 5/2008 |
| JP | 2009028922 A | 2/2009 |
| JP | 2009028923 A | 2/2009 |
| JP | 2009074002 A | 4/2009 |
| JP | 2009-131732 A | 6/2009 |
| JP | 2009184172 A | 8/2009 |
| JP | 2009283155 A | 12/2009 |
| JP | 2010018505 A | 1/2010 |
| JP | 2010167484 A | 8/2010 |
| JP | 2010-248011 A | 11/2010 |
| JP | 4625913 B2 | 2/2011 |
| JP | 2011-048979 A | 3/2011 |
| JP | 2011-058579 A | 3/2011 |
| JP | 2011-159697 A | 8/2011 |
| JP | 2011201976 A | 10/2011 |
| JP | 2011201977 A | 10/2011 |
| JP | 2011235532 A | 11/2011 |
| JP | 2011235556 A | 11/2011 |
| JP | 2011236349 A | 11/2011 |
| JP | 2011-248011 A | 12/2011 |
| JP | 2012-035532 A | 2/2012 |
| JP | 2012030424 A | 2/2012 |
| JP | 2012-119611 A | 6/2012 |
| JP | 2012-166999 A | 9/2012 |
| JP | 5057657 B2 | 10/2012 |
| JP | 2012209545 A | 10/2012 |
| JP | 2012-212939 A | 11/2012 |
| JP | 2012-227310 A | 11/2012 |
| JP | 2012-248011 A | 12/2012 |
| JP | 5111620 B2 | 1/2013 |
| JP | 2013010340 A | 1/2013 |
| JP | 2013010342 A | 1/2013 |
| JP | 2013184346 A | 9/2013 |
| JP | 2013184872 A | 9/2013 |
| JP | 2013207084 A | 10/2013 |
| JP | 2013224475 A | 10/2013 |
| JP | 2014019597 A | 2/2014 |
| JP | 2015093405 A | 5/2015 |
| JP | 2015093795 A | 5/2015 |
| JP | 2015116694 A | 6/2015 |
| JP | 2015-209471 A | 11/2015 |
| JP | 2017-500753 A | 1/2017 |
| KR | 10-2008-0096372 A | 10/2008 |
| KR | 2008113576 A | 12/2008 |
| KR | 10-2009-0114195 A | 11/2009 |
| KR | 10-2010-0051499 A | 5/2010 |
| KR | 10-2010-0057521 A | 5/2010 |
| KR | 10-2010-0112628 A | 10/2010 |
| KR | 10-1002936 B1 | 12/2010 |
| KR | 10-2011-0033284 A | 3/2011 |
| KR | 10-2011-0043376 A | 4/2011 |
| KR | 20110045136 A | 5/2011 |
| KR | 10-2011-0068352 A | 6/2011 |
| KR | 10-1073032 B1 | 10/2011 |
| KR | 10-2011-0134708 A | 12/2011 |
| KR | 10-2012-0033284 A | 4/2012 |
| KR | 2012031698 A | 4/2012 |
| KR | 10-2012-0057346 A | 6/2012 |
| KR | 10-2012-0064676 A | 6/2012 |
| KR | 10-2012-0069608 A | 6/2012 |
| KR | 20120056227 A | 6/2012 |
| KR | 10-1164945 B1 | 7/2012 |
| KR | 20120100274 A | 9/2012 |
| KR | 2013003997 A | 1/2013 |
| KR | 2013044774 A | 5/2013 |
| KR | 20130095605 A | 8/2013 |
| KR | 2013104534 A | 9/2013 |
| KR | 10-2015-0038177 A | 4/2015 |
| KR | 10-1522941 B1 | 6/2015 |
| TW | 201315593 A | 4/2013 |
| TW | 201332768 A | 8/2013 |
| WO | 92/22604 A1 | 12/1992 |

(56) References Cited

FOREIGN PATENT DOCUMENTS

| | | |
|---|---|---|
| WO | 95/17537 A1 | 6/1995 |
| WO | 02/84722 A2 | 10/2002 |
| WO | 03/44079 A1 | 5/2003 |
| WO | 2005048669 A1 | 5/2005 |
| WO | 2006/093639 A1 | 9/2006 |
| WO | 2007/018028 A1 | 2/2007 |
| WO | 2007121524 A1 | 11/2007 |
| WO | 2008/007622 A1 | 1/2008 |
| WO | 2008044884 A1 | 4/2008 |
| WO | 2010/051106 A2 | 5/2010 |
| WO | 2010/059710 A1 | 5/2010 |
| WO | 2010079688 A1 | 7/2010 |
| WO | 2010/098762 A1 | 9/2010 |
| WO | 2010/121524 A1 | 10/2010 |
| WO | 2010/128611 A1 | 11/2010 |
| WO | 2010/129459 A2 | 11/2010 |
| WO | 2011/031507 A1 | 3/2011 |
| WO | 2011/048979 A1 | 4/2011 |
| WO | 2011/104500 A1 | 9/2011 |
| WO | 2011142280 A1 | 11/2011 |
| WO | 2012/000686 A1 | 1/2012 |
| WO | 2012/057893 A2 | 5/2012 |
| WO | 2012/074952 A1 | 6/2012 |
| WO | 2012144499 A1 | 10/2012 |
| WO | 2013/006865 A2 | 1/2013 |
| WO | 2013044941 A1 | 4/2013 |
| WO | 2013058217 A1 | 4/2013 |
| WO | 2013119737 A2 | 8/2013 |
| WO | 2013/179881 A1 | 12/2013 |
| WO | 2014/050798 A1 | 4/2014 |
| WO | 2014/093193 A1 | 6/2014 |
| WO | 2014/093740 A1 | 6/2014 |
| WO | 2014/093775 A1 | 6/2014 |
| WO | 2014/093776 A1 | 6/2014 |
| WO | 2014/142280 A1 | 9/2014 |
| WO | 2014/151353 A1 | 9/2014 |
| WO | 2014163035 A1 | 10/2014 |
| WO | 2015/054098 A1 | 4/2015 |
| WO | 2015/057605 A1 | 4/2015 |
| WO | 2015/112958 A1 | 7/2015 |
| WO | 2015113020 A1 | 7/2015 |
| WO | 2015113023 A1 | 7/2015 |
| WO | 2015119210 A1 | 8/2015 |
| WO | 2015156395 A1 | 10/2015 |
| WO | 2015157202 A1 | 10/2015 |
| WO | 2015163134 A1 | 10/2015 |
| WO | 2016017645 A1 | 2/2016 |
| WO | 2016/187186 A1 | 11/2016 |
| WO | 2016209897 A1 | 12/2016 |
| WO | 2018038961 A1 | 3/2018 |

OTHER PUBLICATIONS

Morita et al; "Applications of Plasma Polymerization"; Pure & Appl. Chem., vol. 57, No. 9 pp. 1277-1286 (1985).
Biederman; "The Properties of Films Prepared by the RF Sputtering of PTFE and Plasma Polymerization of Some Freons" ; Vacuum, vol. 31, No. 7, Jan. 1, 1981, pp. 285-289.
Cech et al; "Surface-Free Energy of Silicon-Based Plasma Polymer Films" ; Silanes and Other Coupling Agents, vol. 5, 2009; pp. 333-348.
Chemraz "Perfluoroelastomers—Seals That Withstand the Test of Time" , Greene Tweed Medical & Biotechnology, 2000, 4 Pages.
Chiao et al; "Worldwide First Ultra-Thin LTPS-TFT LCD by a Glass on Carrier Technology"; V3, Submitted to SID 2015; 5 Pages.
Dupont Kalrez Perfluoroelastomer Parts—Physical Properties and Product Comparisons, Technical Information—Rev. 11, Sep. 2012; 4 Pages.
Girifalco et al; "A Theory for the Estimation of Surface and Interfacial Energies. I. Derivation and Application to Interfacial Tension" ; Applied Science Research Lab, Cincinnati Ohio; vol. 61 (1956); p. 904-909.

Groenewoud et al; "Plasma Polymerization of Thiophene Derivatives" ; Langmuir, 2003, vol. 19, No. 4; pp. 1368-1374.
Haller; "Polymerization of Aromatic Silanes in RF Plasmas" ; J. Electrochem Soc.: Solid-State Science and Technology; vol. 129, No. 1; Jan. 1982; pp. 180-183.
Haque et al; "Preparation and Properties of Plasma-Deposited Films With Surface Energies Varying Over a Wide Range" ; Journal of Applied Polymer Science, vol. 32, 4369-4381 (1986.
Hiltz; Techniques for the Characterization of Fluoroelastomers, Defence R&D Canada-Atlantic Technical Memorandum Dec. 2009; 52 Pages.
Iller, John Wiley and Sons; "The Surface Chemistry of Silica" ; Chapter 6, 1979, pp. 622-656.
Jaszewski et al; "The Deposition of Anti-Adhesive Ultra-Thin Teflon-Like Films and Their Interaction With Polymers During Hot Embossing" ; Applied Surface Science, 143 (1999) 301-308.
Lowe et al; "Plasma Polymerized P-Xylene as a Laser Fusion Target" ; Surface Science, 1978, vol. 76, No. 1; pp. 242-256.
Nagai et al; "Structure and Morphology of Phenylsilanes Polymer Films Synthesized by the Plasma Polymerization Method" ; Journal of Material Science 33, (1998); 1897-1905.
Nehlsen et al; "Gas Permeation Properties of Plasma Polymerized Thin Film Siloxane-Type Membranes for Temperature Up to 350C" ; Journal of Membrane Science; 106 (1995) 1-7.
Parker et al; "Surface Forces Between Plasma Polymer Films" ; Langmuir 1994, 10, 276-2773.
Perlast G67P—Technical Data Sheet, Issue 4, Revision 1, Jan. 2006; 1 Page.
Wu; "Polymer Interface and Adhesion "; Modifications of Polymer Surfaces, Chapter 9—Marcel Dekker; pp. 298-321.
Salyk et al; "Plasma Polymerisation of Methylphenylsilane" ; Surface & Coatings Technology, 20, (2005) pp. 486-489.
Shieh et al; "Modifications of Low Dielectric Constant Fluorinated Amorphous Carbon Films by Multiple Plasma Treatments" ; J. Electro. Soc.; 149 (7) G384-G390 (2002.
Sindorf et al; "Cross-Polarization/Magic-Angle-Spinning Silicon-29 Nuclear Magnetic Resonance Study of Silica Gel Using Trimethylsilane Bonding as a Probe of Surface Geometry and Reactivity" ; J. Phys. Chem. 1982, 86, 5208-85219.
Stoffels et al; "Polymerization of Fluorocarbons in Reactive Ion Etching Plasma" ; Journal of Vacuum Science and Technology; Part A AVS / AIP, Melville, NY, vol. 16, No. 1, Jan. 1, 1998, pp. 87-95.
Suratawal et al; "Surface Chemistry and Trimethylsilyl Functionalization of Stober Silica Sols" ; Journal of Non-Crystalline Solids 316 (2003), pp. 349-363.
Terlingen et al; "Plasma Modification of Polymeric Surfaces for Biomedical Applications" ; Advanced Biomaterials in Biomedical Engineering and Drug Delivery Systems, 1996; pp. 38-42.
Tillet et al; "Crosslinking of Fluoroelastomers by "Click" Azide-Nitride Cyloaddtion" ; Journal of Polymer Science, Part A: Polymer Chemistry; 2015, 53, pp. 1171-1173.
Tong et al; "Reversible Silicon Wafer Bonding for Surface Protection: Water-Enhanced Debonding" ; J. Electrochem. Soc., vol. 139, No. 11, Nov. 1992, pp. L101-L102.
Trelleborg Sealing Solutions, Isolast® Perfluororelastomer Seals, Edition Nov. 2008; pp. 1-16; www.tss.trelleborg.com.
Van De Ven et al; "Deactivation With Silazanes in Chromatography, Mechanism of the Reaction and Practical Consequences in Capillary GC and RP-HPLC: A29SI CP-MAS NMR Study" ; Journal of High Resolution Chromatography & Chromatography Communications; vol. 9, 1986; pp. 741-746.
Wang et al; "Dynamic Contact Angles and Contact Angle Hysteresis of Plasma Polymers" ; Langmuir 1994, 10, pp. 3887-3897.
Zhuravlev; "The Surface Chemistry of Amorphous Silica. Zhuravlev Model" ; Colloids and Surfaces A: Physicochemical and Engineering Aspects; 173 (2000) 1-38.
ASTM International E595-07, Standard Test Method for Total Mass Loss and Collected Volatile Condensable Materials from Outgassing in a Vacuum Environment (2013).
3M Dyneon High Temperature Perfluoroelastomer PFE 4131TZ—Technical Data.
2014 Gelest Brochure—Silane Coupling Agents Connecting Across Boundaries.

(56) References Cited

OTHER PUBLICATIONS

2006 Gelest Brochure on Thermal Stability of Silanes, p. 14.
Bosher et al; "Influence of Cyclic Organosilicon Precursors on the Corrosion of Aluminium Coated Sheet by Atmospheric Pressure Dielectric Barrier Discharge"; Surface & Coatings Technology, 205 (2011) pp. 5350-5357.
Lubguban, Jr. et al.; "Low-K Organosilicate Films Prepared by Tetravinyltetramethylcyclotetrasiloxane", J. of Applied Physics, V92, N2, p. 1033-1038, 2002.
Merche et al; "Atmospheric Plasmas for Thin Film Depsoition: A Critical Review"; Thin Solid Films, 520 (2012) pp. 4219-4236.
Nouicer et al; "Superhydrophobic Surface Produced on Polyimide and Silicon by Plasma Enhanced Chemical Vapour Deposition From Hexamethyldisiloxane Precursor"; International Journal of Nanotechnology, vol. 12, Nos. 8/9, 2015; pp. 597-607.
Rouessac et al; "Precursor Chemistry for ULK CVD", Microelectronic Engineering, V82, p. 333-340, 2005.
Wu; "Calculation of Interfacial Tension in Polymer Systems"; J. Polymer. Sci.: Part C; No. 34, pp. 19-30 (1971.
International Search Report and Written Opinion of the International Searching Authority; PCT/US2017/049019; dated Dec. 11, 2017; 14 Pages; Korean Intellectual Property Office.
English Translation of JP2016547990 Office Action dated Mar. 27, 2019; 3 Pages; Japanese Patent Office.
European Patent Application No. 15740126.6 Office Action dated Jul. 9, 2020; 5 Pages; European Patent Office.
Extended European Search Report and Written Opinion; 15740126. 6; dated Jul. 4, 2017; 9 pages; European Patent Office.
Hair; "Hydroxyl Groups on Silica Surface", Journal of Non-Crystalline Solids; 19 (1975) 299-309, .Copyrgt. North-Holland Publishing.
International Preliminary Report on Patentability of the International Searching Authority; PCT/US15/12865; dated Aug. 11, 2016; 7 Pages; Korean Intellectual Property Office.
International Search Report and Writien Opinion of the International Searching Authority; PCT/US2016/038663; dated Sep. 23, 2016; 11 Pages; European Patent Office.
International Search Report and Writien Opinion of the International Searching Authority; PCT/US2017/049025; dated Feb. 22, 2018; 17 Pages; European Patent Office.
International Search Report and Writien Opinion of the International Searching Authority; PCT/US2018/047056; dated Dec. 7, 2018; 10 Pages; European Patent Office.
International Search Report and Written Opinion of the International Searching Aurthority; PCT/US2017/046836; dated Feb. 7, 2018; 11 Pages; Korean Intellectual Property Office.
International Search Report and Written Opinion of the International Searching Authority; PCT/US15/12865; dated May 22, 2015; 8 Pages; Korean Intellectual Property Office.
International Search Report and Written Opinion of the International Searching Authority; PCT/US2013/073785; dated Mar. 24, 2014; 11 Pages; Korean Patent Office.
International Search Report and Written Opinion of the International Searching Authority; PCT/US2013/074859; dated Mar. 25, 2014; 10 Pages; Korean Patent Office.
International Search Report and Written Opinion of the International Searching Authority; PCT/US2013/074924; dated Mar. 27, 2014; 14 pages; Korean Patent Office.
International Search Report and Written Opinion of the International Searching Authority; PCT/US2013/074926; dated Mar. 21, 2014; 13 Pages; European Patent Office.
International Search Report and Written Opinion of the International Searching Authority; PCT/US2014/059237; dated Mar. 11, 2015; 15 Pages; European Patent Office.
International Search Report and Written Opinion of the International Searching Authority; PCT/US2014/060340; dated Jan. 29, 2015; 13 Pages; European Patent Office.
International Search Report of the International Searching Authority; PCT/US2016/032843; dated Aug. 10, 2016; 14 Pages; European Patent Office.
Invitation to Pay Additional Fees From the International Searching Aurthority; PCT/US2017/049025; dated Nov. 21, 2017; 14 Pages; European Patent Office.
ISR from PCT/US2015/013012.
ISR from PCT/US2015/013017.
ISR from WO2014/'151353.
ISR from WO2014/093775.
ISR from WO2015/054098.
ISR from WO2015/057605.
Kuritka et al; "Mass Spectrometry Characterization of Methylphenylsilane-Hydrogen RF Plasmas"; Plasma Process. Polym. 2007, 4, 53-61.
Kuschnereit et al; "Mechanical and Elastic Properties of Amorphous Hydrogenated Silicon Films Studied by Broadband Surface Acoustic Wave Spectroscopy"; Appl. Phys. A 61, 269-276 (1995).
Maszara et al; "Bonding of Silicon Wafers for Silicon-On-Insulators"; J. Appl. Phys. 64 (10), Nov. 15, 1988; pp. 4943-4950.
McMillian et al; "Hydroxyl Sites in SiO2 Glass: A Note on Irfrared and Raman Spectra", American Mineralogist, vol. 71, pp. 772-778, 1986.
Oujja et al; "Multiphoton Dissociation of Phenylsilane Upon Excitation at 212.5NM"; Laser Chem., vol. 16, pp. 157-166.
PCT—International Search Report form 220 for WO 14/093193; dated Mar. 24, 2014.
PCT—International Search Report form 220 for WO 14/093740; dated Mar. 25, 2014.
PCT—International Search Report form 220 for WO 14/093776; dated Mar. 21, 2014.
Tauc et al; "Optical Properties and Electronic Structure of Amorphous Germanium"; Phys. Stat. Sol. 15, (1966) pp. 627-637.
Weidman et al; "New Photodefinable Glass Etch Masks for Entirely Dry Photolithography Plasma Deposited Organosilicon Hydride Polymers"; Appl. Phys. Leti. 62 (4), Jan. 25, 1993 pp. 372-374.
Worldwide First Ultra-thin LTPS-TFT LCD by a Glass on Carrier Technology, Chiao, et al., v3, submitted to SID 2015.
Singapore Patent Application No. 11201901743W; Office Action dated Jan. 5, 2021; 9 Pages; Singapore Patent Office.
Korean Patent Application No. 10-2019-7008823, Notice of Allowance dated Nov. 20, 2021,1 page (English Translation Only); Korean Patent Office.
Sohn, et al., "Effects of plasma polymerized para-xylene intermediate layers on characteristics of flexible organic light emitting diodes fabricated on polyethylene terephthalate substrates" Journal of Alloys and Compounds, 449, 191-195, 2008. (Year: 2008).

\* cited by examiner

SILOXANE PLASMA POLYMERS FOR SHEET BONDING

CROSS-REFERENCE TO RELATED APPLICATIONS

This application claims the benefit of priority under 35 U.S.C. § 371 of International Application No. PCT/US2017/049019, filed on Aug. 29, 2017, which claims the benefit of priority under 35 U.S.C. § 119 of U.S. Provisional Application No. 62/381,124, filed Aug. 30, 2016, the content both of which are incorporated herein by reference in their entirety.

FIELD

The present disclosure relates generally to articles and methods for processing sheets on carriers and, more particularly, to articles and methods for processing flexible glass sheets on glass carriers.

BACKGROUND

Flexible substrates offer the promise of cheaper devices using roll-to-roll processing, and the potential to make thinner, lighter, more flexible and durable displays. However, the technology, equipment, and processes required for roll-to-roll processing of high quality displays are not yet fully developed. Because panel makers have already heavily invested in toolsets to process large sheets of glass, laminating a flexible substrate to a carrier and making display devices by sheet-to-sheet processing offers a shorter term solution to develop the value proposition of thinner, lighter, and more flexible displays. Displays have been demonstrated on polymer sheets for example polyethylene naphthalate (PEN) where the device fabrication was sheet-to-sheet with the PEN laminated to a glass carrier. However, the upper temperature limit of the PEN limits the device quality and process that can be used. In addition, the high permeability of the polymer substrate leads to environmental degradation of organic light emitting diode (OLED) devices where a near hermetic package is required. Thin film encapsulation offers the promise to overcome this limitation, but it has not yet been demonstrated to offer acceptable yields at large volumes.

In a similar manner, display devices can be manufactured using a glass carrier laminated to one or more thin glass substrates. It is anticipated that the low permeability and improved temperature and chemical resistance of the thin glass will enable higher performance longer lifetime flexible displays.

In low temperature polysilicon (LTPS) device fabrication processes, for example with temperatures approaching 600° C. or greater, vacuum, and wet etch environments may be used. These conditions limit the materials that may be used, and place high demands on the carrier/thin sheet. Accordingly, what is desired is a carrier approach that utilizes the existing capital infrastructure of the manufacturers, enables processing of thin glass, i.e., glass having a thickness≤0.3 millimeters (mm) thick, without contamination or loss of bond strength between the thin glass and carrier at higher processing temperatures, and wherein the thin glass debonds easily from the carrier at the end of the process.

One commercial advantage is that manufacturers will be able to utilize their existing capital investment in processing equipment while gaining the advantages of the thin glass sheets for photo-voltaic (PV) structures, OLED, liquid crystal displays (LCDs) and patterned thin film transistor (TFT) electronics, for example. Additionally, such an approach enables process flexibility, including: processes for cleaning and surface preparation of the thin glass sheet and carrier to facilitate bonding.

A challenge of known bonding methods is the high temperature used to process polysilicon TFTs. The demand for higher pixel density, high resolution, and fast refresh rates on hand held displays, notebook and desktop displays, as well as the wider use of OLED displays, is pushing panel makers from amorphous silicon TFT backplanes to oxide TFT or polysilicon TFT backplanes. Because OLEDs are a current driven device, high mobility is desired. Polysilicon TFTs also offer the advantage of integration of drivers and other components activation. Higher temperature is preferred for dopant activation, ideally at temperature over 600° C.

SUMMARY

In light of the above, there is a need for a thin sheet-carrier article that can withstand the rigors of TFT and flat panel display (FPD) processing, including high temperature processing (without outgassing that would be incompatible with the semiconductor or display making processes in which it will be used), yet allow the entire area of the thin sheet to be removed (either all at once, or in sections) from the carrier so as to allow the reuse of the carrier for processing another thin sheet. The present specification describes methods to control the adhesion between the carrier and thin sheet to create a temporary bond sufficiently strong to survive TFT and FPD processing (including LTPS processing) but weak enough to permit debonding of the sheet from the carrier, even after high-temperature processing. Such controlled bonding can be utilized to create an article having a re-usable carrier, or alternately an article having patterned areas of controlled bonding between a carrier and a sheet. More specifically, the present disclosure provides coating layers (including various materials and associated surface heat treatments), that may be provided on the thin sheet, the carrier, or both, to control both room-temperature van der Waals, and/or hydrogen, bonding and high temperature covalent bonding between the thin sheet and carrier. Even more specifically, the present disclosure describes methods of depositing a coating layer that serves to bond a thin sheet to a carrier, methods for preparing the coating layer for bonding, and bonding the coating layer to both the thin sheet and the carrier. These methods produce bonding between the components such that the bonding energy is not too high, which might render the components inseparable after electronic device processing, and such that the bonding energy is not too low, which might lead to compromised bonding quality thus leading to possible de-bonding or fluid ingress between the thin sheet and carrier during electronic device processing. These methods also produce a glass article that exhibits low outgassing and survives high temperature processing for example, LTPS TFT processing as well additional processing steps, for example wet cleaning and dry etching. In alternative embodiments, the coating layers may be used to create various controlled bonding areas (wherein the carrier and thin sheet remain sufficiently bonded through various processes, including vacuum processing, wet processing, and/or ultrasonic cleaning processing), together with covalent bonding regions to provide for further processing options, for example, maintaining hermeticity between the carrier and sheet even after dicing the article into smaller pieces for additional device processing.

In a first aspect, there is an article comprising:
a first sheet comprising a first sheet bonding surface;
a second sheet comprising a second sheet bonding surface; and
a coating layer comprising a first coating layer bonding surface and a second coating layer bonding surface, the coating layer comprising a plasma-polymerized organosiloxane compound;
the first coating layer bonding surface being bonded with the first sheet bonding surface, and the second coating layer bonding surface being bonded with the second sheet bonding surface.

In an example of aspect 1, the coating layer comprises poly(diphenylsiloxane).

In another example of aspect 1, the first coating layer bonding surface has a surface energy between 40 and 75 mJ/m².

In another example of aspect 1, the coating layer has a thickness of less than 100 nm.

In another example of aspect 1, the coating layer is a single layer.

In another example of aspect 1, the first sheet has a thickness less than 200 μm.

In another example of aspect 1, the first coating layer bonding surface is bonded with the first sheet bonding surface with a bond energy of less than 600 mJ/m2 after subjecting the article to a temperature of 600° C. for 10 minutes in a nitrogen atmosphere.

In another example of aspect 1, the first coating layer bonding surface is bonded with the first sheet bonding surface with a bond energy of less than 700 mJ/m² after subjecting the article to a temperature of 600° C. for 10 minutes in a nitrogen atmosphere, wherein prior to after subjecting the article to a temperature of 600° C., the first coating layer bonding surface was annealed at a temperature of 400° C. in a nitrogen atmosphere prior to the first coating layer bonding surface being bonded to the first sheet bonding surface.

In another example of aspect 1, the first coating layer bonding surface is bonded with the first sheet bonding surface with a bond energy of less than 600 mJ/m² after subjecting the article to a temperature of 600° C. for 10 minutes in a nitrogen atmosphere, wherein prior to after subjecting the article to a temperature of 600° C., the first coating layer bonding surface was annealed at a temperature of 400° C. in a nitrogen atmosphere prior to the first coating layer bonding surface being bonded to the first sheet bonding surface.

In another example of aspect 1, the change in percent blister area is less than 10 when the article is subjected to a temperature of 600° C. for 10 minutes in a nitrogen atmosphere, after the first coating layer bonding surface has been annealed at a temperature of 400° C. in a nitrogen atmosphere prior to the first coating layer bonding surface being bonded to the first sheet bonding surface.

In another example of aspect 1, the change in percent blister area is less than 5 when the article is subjected to a temperature of 600° C. for 10 minutes in a nitrogen atmosphere, after the first coating layer bonding surface has been annealed at a temperature of 400° C. in a nitrogen atmosphere prior to the first coating layer bonding surface being bonded to the first sheet bonding surface.

In another example of aspect 1, the first sheet is a glass sheet.

In another example of aspect 1, the second sheet is a glass sheet.

In another example of aspect 1, the first sheet is a glass sheet and the second sheet is a glass sheet.

In a second aspect, there is provided an article of aspect 1, the plasma-polymerized organosiloxane compound formed by depositing a monomer on at least one of the first sheet bonding surface and the second sheet bonding surface.

In an example of aspect 2, the monomer is deposited on at least one of the first sheet bonding surface and the second sheet bonding surface using low-pressure plasma chemical vapor deposition (CVD) or atmospheric pressure plasma CVD.

In a third aspect, there is provided an article of aspect 2, the monomer comprising a compound of formula $(R^1)_m Si(X^1)_n$, wherein each $R^1$ is independently aryl, alkyl, alkenyl alkynyl, or a combination thereof; m is 1, 2 or 3; each $X^1$ is independently hydrogen, halogen, hydroxy, alkoxy, amino, aryl, alkyl, alkenyl, alkynyl, or a combination thereof; and n is 1, 2 or 3.

In an example of aspect 3, $R^1$ is aryl.

In another example of aspect 3, $X^1$ is alkoxy.

In another example of aspect 3, $R^1$ is aryl and $X^1$ is alkoxy.

In another example of aspect 3, the monomer is phenyltrimethoxysilane, phenyltriethoxysilane, phenyltribromosilane, phenyltrichlorosilane, dimethoxydiphenylsilane, diethoxydiphenylsilane, dibromodiphenylsilane, dichlorodiphenylsilane, bis(dimethylamino)diphenylsilane, bis(diethylamino)diphenylsilane, phenylsilane, or diphenylsilane.

In a fourth aspect, there is provided an article of aspect 2, the monomer comprising a disiloxane compound having the structure below, wherein each of $R^2$-$R^7$ is independently hydrogen, halogen, hydroxy, alkoxy, amino, aryl, alkyl, alkenyl, alkynyl, or a combination thereof.

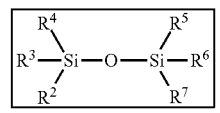

In an example of aspect 4, the monomer is hexamethyldisiloxane.

In a fifth aspect, there is provided an article of aspect 1, the coating layer is comprised of a bottom coating layer and a top coating layer, the bottom coating layer being between the top coating layer and the second sheet.

In an example of aspect 5, the bottom coating layer has a thickness between 10 and 80 nm and the top coating layer has a thickness between 10 and 50 nm.

In a sixth aspect, there is a method of making an article comprising:
forming a coating layer comprising a plasma-polymerized organosiloxane compound on a bonding surface of a second sheet by depositing a monomer on the bonding surface of the second sheet using plasma CVD, the coating layer comprising a coating layer bonding surface; and
bonding the coating layer bonding surface to a bonding surface of a first sheet.

In an example of aspect 6, the monomer is deposited on the bonding surface of the second sheet using low pressure plasma CVD or atmospheric pressure plasma CVD.

In an example of aspect 6, the coating layer comprises poly(diphenylsiloxane).

In another example of aspect 6, the coating layer has a thickness less than 100 nm.

In another example of aspect 6, the coating layer is a single layer.

In another example of aspect 6, the first sheet has a thickness less than 200 μm.

In another example of aspect 6, the coating layer bonding surface is bonded with the first sheet bonding surface with a bond energy of less than 600 mJ/m² after subjecting the article to a temperature of 600° C. for 10 minutes in a nitrogen atmosphere.

In another example of aspect 6, the first sheet is a glass sheet.

In another example of aspect 6, the second sheet is a glass sheet.

In another example of aspect 6, the first sheet is a glass sheet and the second sheet is a glass sheet.

In a seventh aspect, there is provided the method of aspect 6, further comprising increasing the surface energy of the coating layer bonding surface before the bonding surface of the first sheet is bonded to the coating layer bonding surface.

In an example of aspect 7, the surface energy of the coating layer bonding surface is increased by exposing the bonding surface to oxygen, nitrogen, or a combination thereof.

In another example of aspect 7, the surface energy of the coating layer bonding surface is increased to between 40 and 75 mJ/m².

In an eighth aspect, there is provided the method of aspect 6, the monomer comprising a compound of formula $(R^1)_m Si(X^1)_n$, wherein each $R^1$ is independently aryl, alkyl, alkenyl, alkynyl, or a combination thereof; m is 1, 2 or 3; each $X^1$ is independently hydrogen, halogen, hydroxy, alkoxy, amino, aryl, alkyl, alkenyl, alkynyl, or a combination thereof; and n is 1, 2 or 3.

In an example of aspect 8, $R^1$ is aryl.

In another example of aspect 8, $X^1$ is alkoxy.

In another example of aspect 8, $R^1$ is aryl and $X^1$ is alkoxy.

In another example of aspect 8, the monomer is phenyltrimethoxysilane, phenyltriethoxysilane, phenyltribromosilane, phenyltrichlorosilane, dimethoxydiphenylsilane, diethoxydiphenylsilane, dibromodiphenylsilane, dichlorodiphenylsilane, bis(dimethylamino)diphenylsilane, bis(diethylamino)diphenylsilane, phenylsilane, or diphenylsilane.

In a ninth aspect, there is provided the method of aspect 6, the monomer comprising a disiloxane compound having the structure below, wherein each of $R^2$-$R^7$ is independently hydrogen, halogen, hydroxy, alkoxy, amino, aryl, alkyl, alkenyl, alkynyl, or a combination thereof.

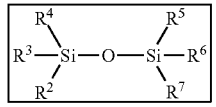

In an example of aspect 9, the monomer is hexamethyldisiloxane.

In a tenth aspect, there is provided the method of aspect 6, the coating layer being comprised of a bottom coating layer and a top coating layer, the bottom coating layer being between the top coating layer and the second sheet.

In another example of aspect 10, the bottom coating layer has a thickness between 10 and 80 nm and the top coating layer has a thickness between 10 and 50 nm.

In an eleventh aspect, there is provided the method of aspect 6, further comprising subjecting the coating layer to thermal annealing before the first sheet and the coating layer are bonded.

In an example of aspect 11, the coating layer is subjected to thermal annealing in a nitrogen atmosphere.

In another example of aspect 11, the coating layer is subjected to thermal annealing at a temperature of at least 300° C.

In another example of aspect 11, the coating layer is subjected to thermal annealing at a temperature of at least 400° C.

In another example of aspect 11, the coating layer bonding surface is bonded with the first sheet bonding surface with a bond energy of less than 700 mJ/m² after subjecting the article to a temperature of 600° C. for 10 minutes in a nitrogen atmosphere.

In another example of aspect 11, the coating layer bonding surface is bonded with the first sheet bonding surface with a bond energy of less than 600 mJ/m² after subjecting the article to a temperature of 600° C. for 10 minutes in a nitrogen atmosphere.

In another example of aspect 11, the change in percent blister area is less than 10 when the article is subjected to a temperature of 600° C. for 10 minutes in a nitrogen atmosphere.

In another example of aspect 11, the change in percent blister area is less than 5 when the article is subjected to a temperature of 600° C. for 10 minutes in a nitrogen atmosphere.

In a twelfth aspect, there is an article comprising:
a first sheet comprising a first sheet bonding surface;
a second sheet comprising a second sheet bonding surface; and
a coating layer comprising a first coating layer bonding surface and a second coating layer bonding surface, the coating layer comprising poly(diphenylsiloxane);
the first coating layer bonding surface being bonded with the first sheet bonding surface, and the second coating layer bonding surface being bonded with the second sheet bonding surface.

In an example of aspect 12, the first coating layer bonding surface has a surface energy between 40 and 75 mJ/m².

In another example of aspect 12, the coating layer has thickness of less than 100 nm.

In another example of aspect 12, the coating layer is a single layer formed by depositing the monomer.

In another example of aspect 12, the first sheet having a thickness less than 200 μm.

In another example of aspect 12, the first coating layer bonding surface is bonded with the first sheet bonding surface with a bond energy of less than 700 mJ/m² after subjecting the article to a temperature of 600° C. for 10 minutes in a nitrogen atmosphere, wherein prior to after subjecting the article to a temperature of 600° C., the first coating layer bonding surface was annealed at a temperature of 400° C. in a nitrogen atmosphere prior to the first coating layer bonding surface being bonded to the first sheet bonding surface.

In another example of aspect 12, the first coating layer bonding surface is bonded with the first sheet bonding surface with a bond energy of less than 600 mJ/m² after subjecting the article to a temperature of 600° C. for 10 minutes in a nitrogen atmosphere, wherein prior to after subjecting the article to a temperature of 600° C., the first coating layer bonding surface was annealed at a temperature of 400° C. in a nitrogen atmosphere prior to the first coating layer bonding surface being bonded to the first sheet bonding surface.

In another example of aspect 12, the change in percent blister area is less than 10 when the article is subjected to a temperature of 600° C. for 10 minutes in a nitrogen atmosphere, after the first coating layer bonding surface has been annealed at a temperature of 400° C. in a nitrogen atmosphere prior to the first coating layer bonding surface being bonded to the first sheet bonding surface.

In another example of aspect 12, the change in percent blister area being less than 5 when the article is subjected to a temperature of 600° C. for 10 minutes in a nitrogen atmosphere, after the first coating layer bonding surface has been annealed at a temperature of 400° C. in a nitrogen atmosphere prior to the first coating layer bonding surface being bonded to the first sheet bonding surface.

In another example of aspect 12, the first sheet is a glass sheet.

In another example of aspect 12, the second sheet is a glass sheet.

In another example of aspect 12, the first sheet is a glass sheet and the second sheet is a glass sheet.

In a thirteenth aspect, there is provided an article of aspect 12, the poly(diphenylsiloxane) coating layer formed by depositing a monomer on at least one of the first sheet bonding surface and the second sheet bonding surface.

In an example of aspect 13, the monomer is deposited on at least one of the first sheet bonding surface and the second sheet bonding surface using low-pressure plasma CVD, or atmospheric pressure plasma CVD.

In another example of aspect 13, the monomer comprises a diphenylsilane compound having the structure below, wherein $X^2$ and $X^3$ are independently hydrogen, halogen, hydroxy, alkoxy, amino, aryl, alkyl, alkenyl, alkynyl, or a combination thereof.

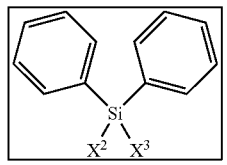

In a fourteenth aspect, there is provided an article of aspect 12, the coating layer being comprised of a bottom coating layer and a top coating layer, the bottom coating layer being between the top coating layer and the second sheet.

In another example of aspect 14, the bottom coating layer has a thickness between 10 and 80 nm and the top coating layer has a thickness between 10 and 50 nm.

In a fifteenth aspect, there is a method of making an article comprising:

forming a coating layer comprising poly(diphenylsiloxane) on a bonding surface of a second sheet by depositing a monomer on the bonding surface of the second sheet, the coating layer comprising a coating layer bonding surface; and bonding the coating layer bonding surface to a bonding surface of a first sheet.

In an example of aspect 15, the monomer is deposited on the bonding surface of the second sheet using low pressure plasma CVD, or atmospheric pressure plasma CVD.

In another example of aspect 15, the monomer comprises a diphenylsilane compound having the structure below, wherein $X^2$ and $X^3$ are independently hydrogen, halogen, hydroxy, alkoxy, amino, aryl, alkyl, alkenyl, alkynyl, or a combination thereof.

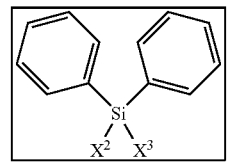

In another example of aspect 15, the coating layer has a thickness less than 100 nm.

In another example of aspect 15, the coating layer being a single layer.

In another example of aspect 15, the first sheet has a thickness less than 200 μm.

In another example of aspect 15, the first sheet is a glass sheet.

In another example of aspect 15, the second sheet is a glass sheet.

In another example of aspect 15, the first sheet is a glass sheet and the second sheet is a glass sheet.

In a sixteenth aspect, there is provided the method of aspect 15, the coating layer being comprised of a bottom coating layer and a top coating layer, the bottom coating layer being between the top coating layer and the second sheet.

In another example of aspect 16, the bottom coating layer has a thickness between 10 and 80 nm and the top coating layer has a thickness between 10 and 50 nm.

In a seventeenth aspect, there is provided the method of aspect 15, further comprising subjecting the coating layer to thermal annealing before the first sheet and the coating layer are bonded.

In an example of aspect 17, the coating layer is subjected to thermal annealing in a nitrogen atmosphere.

In another example of aspect 17, the coating layer is subjected to thermal annealing at a temperature of at least 300° C.

In another example of aspect 17, the coating layer is subjected to thermal annealing at a temperature of at least 400° C.

In another example of aspect 17, the coating layer bonding surface is bonded with the first sheet bonding surface with a bond energy of less than 700 mJ/m² after subjecting the article to a temperature of 600° C. for 10 minutes in a nitrogen atmosphere.

In another example of aspect 17, the coating layer bonding surface is bonded with the first sheet bonding surface with a bond energy of less than 600 mJ/m² after subjecting the article to a temperature of 600° C. for 10 minutes in a nitrogen atmosphere.

In another example of aspect 17, the change in percent blister area is less than 10 when the article is subjected to a temperature of 600° C. for 10 minutes in a nitrogen atmosphere.

In another example of aspect 17, the change in percent blister area is less than 5 when the article is subjected to a temperature of 600° C. for 10 minutes in a nitrogen atmosphere.

Any one of the above aspects may be provided alone or in combination with any one or more of the examples of that aspect discussed above; i.e. the first aspect may be provided alone or in combination with any one or more of the examples of the first aspect discussed above; and the second aspect may be provided alone or in combination with any one or more of the examples of the second aspect discussed above; and so-forth.

The accompanying drawings are included to provide a further understanding of principles of the disclosure, and are incorporated in and constitute a part of this specification. The drawings illustrate one or more embodiment(s), and together with the description serve to explain, by way of example, principles and operation thereof. It is to be understood that various features disclosed in this specification and in the drawings can be used in any and all combinations. By way of non-limiting example the various features may be combined with one another as set forth in the specification, above, as aspects.

BRIEF DESCRIPTION OF THE DRAWINGS

The above and other features, aspects and advantages of the embodiments disclosed in the present specification are better understood when the following detailed description thereof is read with reference to the accompanying drawings, in which.

DETAILED DESCRIPTION

Figure 1:
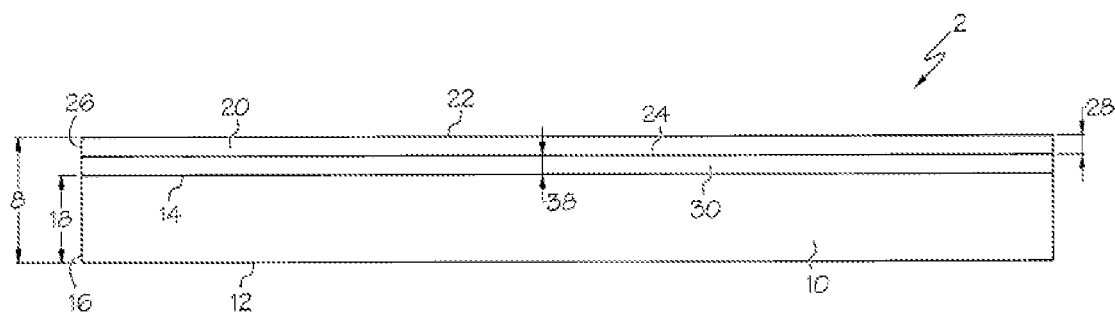
FIG. 1 is a schematic side view of an article having a carrier bonded to a thin sheet with a coating layer therebetween.

Exemplary embodiments will now be described more fully hereinafter with reference to the accompanying drawings. Whenever possible, the same reference numerals are used throughout the drawings to refer to the same or like parts. However, the claimed subject matter may be embodied in many different forms and should not be construed as limited to the embodiments set forth herein.

Directional terms as used herein (e.g., up, down, right left, front, back, top, bottom) are made only with reference to the figures as drawn and are not intended to imply absolute orientation.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Provided are solutions for allowing the processing of a first sheet on a second sheet, whereby at least portions (including up to all) of a first sheet, for example, the thin glass sheet, remain "non-bonded" so that devices processed on the thin sheet may be removed from the second sheet, for example, a carrier. In order to maintain advantageous surface shape characteristics, the carrier is typically a display grade glass substrate. Accordingly, in some situations, it is wasteful and expensive to merely dispose of the carrier after one use. Thus, in order to reduce costs of display manufacture, it is desirable to be able to reuse the carrier to process more than one thin sheet substrate. The present disclosure sets forth articles and methods for enabling a thin sheet to be processed through the harsh environment of the processing lines, for example TFT, including high temperature processing, wherein high temperature processing is processing at a temperature ≥400° C., and may vary depending upon the type of device being made, for example, temperatures up to about 450° C. as in amorphous silicon or amorphous indium gallium zinc oxide (IGZO) backplane processing, up to about 500-550° C. as in crystalline IGZO processing, or up to about 600-650° C. as is typical in LTPS and TFT processes—and yet still allows the thin sheet to be easily removed from the carrier without damage (for example, wherein one of the carrier and the thin sheet breaks or cracks into two or more pieces) to the thin sheet or carrier, whereby the carrier may be reused.

Glass Article

Figure 2:
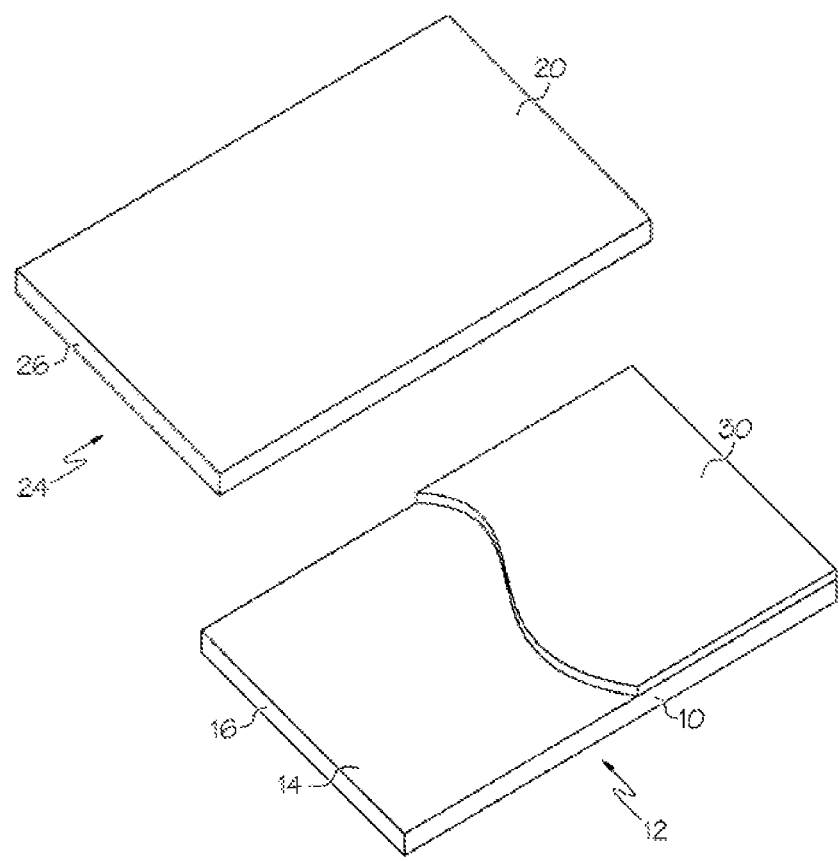
FIG. 2 is an exploded and partially cut-away view of the article in FIG. 1.

As shown in FIGS. 1 and 2, a glass article 2 has a thickness 8, and includes a first sheet 20 (e.g., thin glass sheet, for example, one having a thickness of equal to or less than about 300 μm, including but not limited to thicknesses of, for example, 10-50 μm, 50-100 μm, 100-150 μm, 150-300 μm, 300, 250, 200, 190, 180, 170, 160, 150 140, 130, 120 110 100, 90, 80, 70, 60, 50, 40 30, 20, or 10 μm) having a thickness 28, a coating layer 30 having a thickness 38, and a second sheet 10 (e.g., a carrier) having a thickness 18.

The glass article 2 is arranged to allow the processing of first sheet 20 in equipment designed for thicker sheets, for example, those on the order of greater than or equal to about 0.4 mm, for example 0.4 mm, 0.5 mm, 0.6 mm, 0.7 mm, 0.8 mm, 0.9 mm, or 1.0 mm, although the first sheet 20 itself is equal to or less than about 300 μm. The thickness 8, which is the sum of thicknesses 18, 28, and 38, can be equivalent to that of the thicker sheet for which a piece of equipment, for example, equipment designed to dispose electronic device components onto substrate sheets, was designed to process. In an example, if the processing equipment was designed for a 700 μm sheet, and the first sheet had a thickness 28 of 300 μm, then thickness 18 would be selected as 400 μm, assuming that thickness 38 is negligible. That is, the coating layer 30 is not shown to scale, but rather it is greatly exaggerated for sake of illustration only. Additionally, in FIG. 2, the coating layer is shown in cut-away. The coating layer can be disposed uniformly over the bonding surface 14 when providing a reusable carrier. Typically, thickness 38 will be on the order of nanometers, for example 2 nm to 1 μm, 5 nm to 250 nm, 10 to 50 nm, or 20 to 100 nm, or about 30, 40, 50, 60, 70, 80 or 90 nm. The presence of a coating layer may be detected by surface chemistry analysis, for example by time-of-flight secondary ion mass spectrometry (ToF Sims).

Second sheet 10 has a first surface 12, a bonding surface 14, and a perimeter 16. The second sheet 10 may be of any suitable material including glass. In other examples, the second sheet can be a non-glass material, for example, ceramic, glass-ceramic, silicon wafer, or metal (as the surface energy and/or bonding may be controlled in a manner similar to that described below in connection with a glass carrier). If made of glass, second sheet 10 may be of any suitable composition including alumino-silicate, boro-silicate, alumino-boro-silicate, soda-lime-silicate, and may be either alkali containing or alkali-free depending upon its ultimate application. Thickness 18 may be from about 0.2 to 3 mm, or greater, for example 0.2, 0.3, 0.4, 0.5, 0.6, 0.65, 0.7, 1.0, 2.0, or 3 mm, or greater, and will depend upon the thickness 28, and thickness 38 when such is non-negligible, as noted above. In one embodiment, the second sheet 10 may be made of one layer, as shown, or multiple layers (including multiple thin sheets) that are bonded together. Further, the carrier may be of a Gen 1 size or larger, for example, Gen 2, Gen 3, Gen 4, Gen 5, Gen 8 or larger (e.g., sheet sizes from 100 mm×100 mm to 3 meters×3 meters or greater).

The first sheet 20 has a first surface 22, a bonding surface 24, and a perimeter 26. Perimeters 16 (second sheet) and 26 may be of any suitable shape, may be the same as one another, or may be different from one another. Further, the first sheet 20 may be of any suitable material including glass, ceramic, silicon wafer, glass-ceramic, or metal. As described above for the second sheet 10, when made of glass, first sheet 20 may be of any suitable composition, including alumino-silicate, boro-silicate, alumino-boro-silicate, soda-lime-silicate, and may be either alkali containing or alkali free depending upon its ultimate application. The coefficient of thermal expansion of the thin sheet can be matched substantially the same with that of the carrier to reduce any warping of the article during processing at elevated temperatures. The thickness 28 of the first sheet 20 is 300 μm or less, as noted above. Further, the first sheet may be of a Gen 1 size or larger, for example, Gen 2, Gen 3, Gen 4, Gen 5, Gen 8 or larger (e.g., sheet sizes from 100 mm×100 mm to 3 meters×3 meters or greater).

The glass article 2 can have a thickness that accommodates processing with existing equipment, and likewise it can survive the harsh environment in which the processing takes place. For example, flat panel display (FPD) processing may include wet ultrasonic, vacuum, and high temperature (e.g., ≥400° C.), processing. For some processes, as noted above, the temperature may be ≥500° C., ≥550° C., ≥600° C., ≥650° C., and ≥700° C.

To survive the harsh environment in which article 2 will be processed, the bonding surface 14 should be bonded to bonding surface 24 with sufficient strength so that the first sheet 20 does not separate from second sheet 10. And this strength should be maintained throughout the processing so that first sheet 20 does not separate from second sheet 10 during processing. Further, to allow first sheet 20 to be removed from second sheet 10 (so that second sheet 10 may be reused, for example), the bonding surface 14 should not be bonded to bonding surface 24 too strongly either by the initially designed bonding force, and/or by a bonding force that results from a modification of the initially designed bonding force as may occur, for example, when the article undergoes processing at high temperatures, e.g., temperatures of ≥400° C. to ≥750° C. The coating layer 30 may be used to control the strength of bonding between bonding surface 14 and bonding surface 24 so as to achieve both of these objectives. The controlled bonding force is achieved by controlling the contributions of van der Waals (and/or hydrogen bonding) and covalent attractive energies to the total adhesion energy which is controlled by modulating the polar and non-polar surface energy components of first sheet 20 and second sheet 10. This controlled bonding is strong enough to survive FPD processing, for instance, including temperatures ≥400° C., and in some instances, processing temperatures of ≥500° C., ≥550° C., ≥600° C., ≥650° C., and ≥700° C., and remain de-bondable by application of a force sufficient to separate the sheets but not cause significant damage to first sheet 20 and/or second sheet 10. For example, the force should not break either the first sheet 20 or second sheet 10. Such de-bonding permits removal of first sheet 20 and the devices fabricated thereon, and also allows for re-use of second sheet 10 as a carrier.

Although the coating layer 30 is shown as a solid layer between first sheet 20 and second sheet 10, such need not be the case. For example, the coating layer 30 may be on the order of 0.1 nm to 1 μm thick (e.g., 1 nm to 10 nm, 10 nm to 50 nm, 100 nm, 250 nm, 500 nm to 1 μm), and may not completely cover the entire portion of the bonding surface 14. For example, the coverage may be ≤100%, from 1% to 100%, from 10% to 100%, from 20% to 90%, or from 50% to 90% of the bonding surface 14. In other embodiments, the coating layer 30 may be up to 50 nm thick, or in other embodiments even up to 100 nm to 250 nm thick. The coating layer 30 may be considered to be disposed between second sheet 10 and first sheet 20 even though it may not contact one or the other of second sheet 10 and first sheet 20. In another aspect of the coating layer 30, the layer modifies the ability of the bonding surface 14 to bond with bonding surface 24, thereby controlling the strength of the bond between the second sheet 10 and the first sheet 20. The material and thickness of the coating layer 30, as well as the treatment of the bonding surfaces 14, 24 prior to bonding, can be used to control the strength of the bond (energy of adhesion) between second sheet 10 and first sheet 20.

Coating Layer Composition

Examples of coating layers include organosiloxanes, particularly organosiloxane polymers. Such organosiloxane polymers may be formed by depositing a monomer comprising an oxygen-silicon bond on at least one of the thin sheet or the carrier or by depositing a silicon-containing monomer in the presence of an oxidant. An oxidant can also be used when depositing a monomer comprising an oxygen-silicon bond.

One group of monomers suitable for forming organosiloxane polymers are compounds of formula $(R^1)_m Si(X^1)_n$, as shown below, wherein each $R_1$ is independently aryl, alkyl, alkenyl, alkynyl, or a combination thereof (i.e. arylalkyl); m is 1, 2 or 3; each $X^1$ is independently a precursor group or a leaving group; and n is 1, 2 or 3. Examples of precursor groups include hydroxy and alkoxy. Examples of leaving groups include hydrogen, halogen, amino, aryl, alkyl, alkenyl, alkynyl, and combinations thereof (i.e., arylalkyl). When $X^1$ is a leaving group, such as when the compound is phenylsilane or diphenylsilane, organosiloxane polymers can be produced by reacting these monomers with an oxidizer, for example air, oxygen, nitrous oxide, carbon dioxide, water vapor, or hydrogen peroxide. The reaction can be carried out in plasma prior to deposition. Examples of preferred compounds according to this group of monomers are phenyltrimethoxysilane, phenyltriethoxysilane, phenyltribromosilane, phenyltrichlorosilane, dimethoxydiphenylsilane, diethoxydiphenylsilane, dibromodiphenylsilane, dichlorodiphenylsilane, bis(dimethylamino)diphenylsilane, bis(diethylamino)diphenylsilane, phenylsilane, or diphenylsilane.

In a preferred embodiment, $R^1$ is aryl. In another preferred embodiment, $X^1$ is alkoxy. In yet another preferred embodiment, $R^1$ is aryl and $X^1$ is alkoxy. In still another preferred embodiment, the monomer is a diphenylsilicone compound having the structure below, wherein $X^2$ and $X^3$ are independently hydrogen, halogen, hydroxy, alkoxy, amino, aryl, alkyl, alkenyl, alkynyl, or a combination thereof (i.e., arylalkyl). Preferably, the monomer is dimethoxydiphenylsilane or diethoxydiphenylsilane (corresponding to $X^2$ and $X^3$ both being methoxy or both being ethoxy). Depositing such monomers preferably results in an organosiloxane polymer that is poly(diphenylsiloxane).

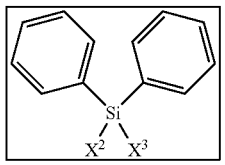

Another group of monomers suitable for forming organosiloxane polymers are disiloxane compounds having the structure below, wherein $R^2$-$R^7$ are independently selected from hydrogen, halogen, hydroxy, alkoxy, amino, aryl, alkyl, alkenyl, alkynyl, or a combination thereof (i.e., arylalkyl). In a preferred embodiment, the monomer is hexamethyldisiloxane.

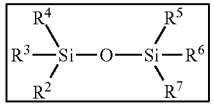

The coating layer can comprise a single layer. The coating layer preferably has a thickness of less than 100 nm, for example less than 90 nm, less than 80 nm, less than 70 nm, less than 60 nm, less than 50 nm, less than 40 nm, less than 30 nm, less than 20 nm, or less than 10 nm.

The coating layer can also comprise more than one layer, for example two layers. The coating layer can comprise a bottom coating layer and a top coating layer, wherein the bottom coating layer is suitable for bonding to the carrier and the top coating layer is suitable for bonding to the thin sheet. The bottom coating layer is preferably less than 50 nm, for example less than 40 nm, less than 30 nm, less than 20 nm, or less than 10 nm. The top coating layer is preferably less than 30 nm, for example less than 20 nm, or less than 10 nm. The bottom coating layer preferably has more elastomeric organosilicon whereas the top coating layer preferably has more siloxane presence.

Deposition of the Coating Layer

Examples of coating methods, for providing a coating layer, include chemical vapor deposition (CVD) techniques, and like methods. Specific examples of CVD techniques include CVD, low pressure CVD, atmospheric pressure CVD, Plasma Enhanced CVD (PECVD), atmospheric plasma CVD, atomic layer deposition (ALD), plasma ALD, and chemical beam epitaxy. Another example of a coating method is with the use of wet chemistry, which may be used in some examples.

The reactive gas mixture, which contains the organosilane or organosiloxane monomer, may also comprise a controlled amount of an oxidizer, for example air, oxygen, nitrous oxide, carbon dioxide, water vapor, or hydrogen peroxide, and/or inert gas, for example, helium, neon, argon, krypton, xenon.

Surface Energy of the Coating Layer

The coating layer can provide a bonding surface with a surface energy in a range of from about 40 to about 75 mJ/m$^2$, as measured for one surface (including polar and dispersion components), whereby the surface produces weak bonding.

In general, the surface energy of the coating layer can be measured upon being deposited and/or further treated, for example by activation with nitrogen. The surface energy of the solid surface is measured indirectly by measuring the static contact angles of three liquids—water, diiodomethane and hexadecane—individually deposited on the solid surface in air. Surface energies as disclosed herein were determined according to the Wu model. (See: S. Wu, J. Polym. Sci. C, 34, 19, 1971). In the Wu model, the surface energies, including total, polar, and dispersion components, are measured by fitting a theoretical model to three contact angles of three test liquids: water, diiodomethane and hexadecane. From the contact angle values of the three liquids, a regression analysis is done to calculate the polar and dispersion components of the solid surface energy. The theoretical model used to calculate the surface energy values includes the following three independent equations relating the three contact angle values of the three liquids and the dispersion and polar components of surface energies of the solid surface (denoted by the subscript "S") as well as the three test liquids:

$$\gamma_W(1+\cos\theta_W) = 4\left(\frac{\gamma_W^d \gamma_S^d}{\gamma_W^d + \gamma_S^d} + \frac{\gamma_W^p \gamma_S^p}{\gamma_W^p + \gamma_S^p}\right) \quad (1)$$

$$\gamma_D(1+\cos\theta_D) = 4\left(\frac{\gamma_D^d \gamma_S^d}{\gamma_D^d + \gamma_S^d} + \frac{\gamma_D^p \gamma_S^p}{\gamma_D^p + \gamma_S^p}\right) \quad (2)$$

$$\gamma_H(1+\cos\theta_H) = 4\left(\frac{\gamma_H^d \gamma_S^d}{\gamma_H^d + \gamma_S^d} + \frac{\gamma_H^p \gamma_S^p}{\gamma_H^p + \gamma_S^p}\right) \quad (3)$$

where, the subscripts "W", "D" and "H" stand for water, diiodomethane and hexadecane, respectively, and the superscripts "d" and "p" stand for dispersion and polar components of surface energies, respectively. Because diiodomethane and hexadecane are practically non-polar liquids, the above set of equations reduces to:

$$\gamma_W(1+\cos\theta_W) = 4\left(\frac{\gamma_W^d \gamma_S^d}{\gamma_W^d + \gamma_S^d} + \frac{\gamma_W^p \gamma_S^p}{\gamma_W^p + \gamma_S^p}\right) \quad (4)$$

$$\gamma_D(1+\cos\theta_D) = 4\left(\frac{\gamma_D^d \gamma_S^d}{\gamma_D^d + \gamma_S^d}\right) \quad (5)$$

$$\gamma_H(1+\cos\theta_H) = 4\left(\frac{\gamma_H^d \gamma_S^d}{\gamma_H^d + \gamma_S^d}\right) \quad (6)$$

From the above set of three equations (4-6), by regression analysis, the two unknown parameters, dispersion and polar surface energy components of the solid surface, $\gamma_S^d$ and $\gamma_S^p$ are calculated. However, with this approach, there is a limiting maximum value up to which the surface energy of the solid surface could be measured. That limiting maximum value is the surface tension of water which is 73 mJ/m$^2$. If the surface energy of the solid surface is appreciably greater than the surface tension of water, the surface will be fully wetted by water, thereby rendering the contact angle approach zero. Beyond this value of surface energy, therefore, all calculated surface energy values would correspond to about 73-75 mJ/m² irrespective of the real surface energy value. For example, if the real surface energies of two solid surfaces are 75 mJ/m² and 150 mJ/m², the calculated values using the liquid contact angles will be about 75 mJ/m² for both surfaces.

Accordingly, all contact angles disclosed herein are measured by placing liquid droplets on the solid surface in air and measuring the angle between the solid surface and the liquid-air interface at the contact line. Therefore, when a claim is made on the surface energy value being from 40 mJ/m² to 75 mJ/m² it should be understood that these values correspond to calculated surface energy values based on the method described above and not the real surface energy values which could be greater than 75 mJ/m² when the calculated value approaches that value.

Annealing of the Coating Layer

After the coating layer is deposited, it can optionally be annealed. The annealing can serve to remove partially polymerized materials in the coating layer. This removal can significantly decrease outgassing of the coating layer, for example, during processing of the first sheet and second sheet at elevated temperatures. This decrease in outgassing can lead to a stronger bond at elevated temperatures, which allows for more successful processing of the thin sheet. The annealing can take place in a Rapid Thermal Processing system (RTP). The annealing can be at temperature above 100° C., for example above 200° C., above 300° C., above 400° C., above 500° C., or above 600° C. The annealing can occur in atmosphere including, for example, nitrogen, oxygen, or air. The annealing can be for at least 15 seconds, for example at least 30 seconds, at least 45 second, at least 1 minute, at least 2 minutes, at least 3 minutes, at least 4 minutes, at least 5 minutes, at least 6 minutes, at least 7 minutes, at least 8 minutes, at least 9 minutes, or at least 10 minutes. The time and temperature for the annealing may vary depending upon the composition of the coating layer. Whether a particular annealing time and temperature are sufficient for a particular composition may be determined by use of outgassing TEST #1. That is, for a particular composition of the coating layer, a time-temperature annealing cycle may be performed, and then outgassing TEST #1 (described below) may be performed. If there if there is a change in surface energy of the cover (in outgassing TEST #1) of <10 mJ/m², then the time-temperature annealing cycle is sufficient to minimize outgassing. Alternatively, the sufficiency of a particular annealing time and temperature (to minimize outgassing) may be analyzed by observing change in thickness of the coating layer when subject to a particular test temperature for the test time. More specifically, a substrate having a coating layer deposited therein is put through a particular time-temperature annealing process to be tested for sufficiency. After going through the time-temperature annealing process, the substrate and coating layer (without another substrate bonded thereto to cover the coating layer) are put through the desired time-temperature device processing cycle. If after the desired time-temperature device processing cycle there is minimal change in thickness of the coating layer, then the annealing process is sufficient to minimize outgassing. To find a rough starting point for annealing time-temperature cycles, one could look at a thermogravimetric analysis of the material to be used as the coating layer. The temperature around the expected device processing temperature and at which most material thickness reduction (or material loss) occurs would be a good starting temperature. Then, time and temperature could be varied to see what would provide the most effective combination leading to minimized outgassing. In general, as annealing temperature increases, the time to provide a sufficient annealing effect reduces. Similarly, as annealing temperature decreases, the time to provide sufficient annealing effect increases.

Surface Activation of the Coating Layer

The desired surface energy for bonding may not be achieved by the surface energy of the initially deposited organosiloxane coating layer. Thus, the deposited layer may be further treated. For example, after the coating layer is deposited, one or more functional groups can optionally be added to add additional bonding capabilities to the coating layer. For example, adding the functional group can provide an additional site of bonding between the coating layer and the thin sheet. The functional group can be added using plasma, for example atmospheric or low pressure plasma. The functional group is preferably polar, and can be added using a precursor for example hydrogen, carbon dioxide, nitrogen, nitrous oxide, ammonia, acrylic acid, allyl amine, allyl alcohol, or mixtures thereof.

Bonding Energy of the First Sheet or Second Sheet to the Coating Layer

In general, the energy of adhesion (i.e., bond energy) between two surfaces can be measured by a double cantilever beam method or wedge test. The tests simulate in a qualitative manner the forces and effects on an adhesive bond join at a coating layer/first sheet or second sheet interface. Wedge tests are commonly used for measuring bonding energy. For example, ASTM D5041, Standard Test Method for Fracture Strength in Cleavage of Adhesives in Bonded Joints, and ASTM D3762, Standard Test Method for Adhesive-Bonded Surface Durability of Aluminum, are standard test methods for measuring bonding of substrates with a wedge.

As an example, a summary of the test method can include recording the temperature and relative humidity under which the testing is conducted, for example, that in a lab room. The first sheet is gently initially debonded or separated at a corner of the glass article to break the bond between the first sheet and the second sheet, i.e., debonding initiation. A sharp razor can be used to initiate debonding of the first sheet from the second sheet, for example, a GEM brand razor with a thickness of 228±20 μm. In forming the debonding initiation, momentary sustained pressure may be needed to fatigue the bond. A flat razor having the aluminum tab removed is slowly inserted until the debonding front can be observed to propagate such that the debonded portion and separation between the sheets increases. The flat razor does not need to be inserted significantly to induce a debond initiation. Once a debond initiation is formed, the glass article is permitted to rest for at least 5 minutes to allow the debonded area to stabilize. Longer rest times may be needed for high humidity environments, for example, above 50% relative humidity.

The glass article with the developed debonding initiation is evaluated with a microscope to record the debonded length. The debonded length is measured from the end separation point of the first sheet from the second sheet (i.e. furthest separation point from the tip of razor) and the closest non-tapered portion of the razor. The debond length is recorded and used in the following equation to calculate bond energy.

$$\gamma = 3t_b^2 E_1 t_{w1}^3 E_2 t_{w2}^3 / 16 L^4 (E_1 t_{w1}^3 + E_2 t_{w2}^3) \qquad (7)$$

wherein γ represents the bond energy, $t_b$ represents the thickness of the blade, razor or wedge, $E_1$ represents the Young's modulus of the first sheet (e.g., thin glass sheet), $t_{w1}$ represents the thickness of the first sheet, $E_2$ represents the Young's modulus of the second sheet (e.g., a glass carrier), $t_{w2}$ represents the thickness of the second sheet and L is the debond length between the first sheet and second sheet upon insertion of the blade, razor or wedge as described above.

The bond energy is understood to behave as in silicon wafer bonding, where an initially hydrogen bonded pair of wafers are heated to convert much or all the silanol-silanol hydrogen bonds to Si—O—Si covalent bonds. While the initial, room temperature, hydrogen bonding produces bond energies of the order of about 100-200 mJ/m² which allows separation of the bonded surfaces, a fully covalently bonded wafer pair as achieved during high temperature processing (on the order of 400 to 800° C.) has adhesion energy of about 2000-3000 mJ/m² which does not allow separation of the bonded surfaces; instead, the two wafers act as a monolith. On the other hand, if both the surfaces are perfectly coated with a low surface energy material, for example a fluoropolymer, with thickness large enough to shield the effect of the underlying substrate, the adhesion energy would be that of the coating material, and would be very low leading to low or no adhesion between the bonding surfaces. Accordingly, the thin sheet would not be able to be processed on the carrier. Consider two extreme cases: (a) two standard clean 1 (SC1, as known in the art) cleaned glass surfaces saturated with silanol groups bonded together at room temperature via hydrogen bonding (whereby the adhesion energy is about 100-200 mJ/m²) followed by heating to a temperature that converts the silanol groups to covalent Si—O—Si bonds (whereby the adhesion energy becomes 2000-3000 mJ/m²). This latter adhesion energy is too high for the pair of glass surfaces to be detachable; and (b) two glass surfaces perfectly coated with a fluoropolymer with low surface adhesion energy (about 12-20 mJ/m² per surface) bonded at room temperature and heated to high temperature. In this latter case (b), not only do the surfaces not bond at low temperature (because the total adhesion energy of about 24-40 mJ/m², when the surfaces are put together, is too low), they do not bond at high temperature either as there are too few polar reacting groups. Between these two extremes, a range of adhesion energies exist, for example between 50-1000 mJ/m², which can produce the desired degree of controlled bonding. Accordingly, the inventors have found various methods of providing a coating layer leading to a bonding energy that is between these two extremes, and such that there can be produced a controlled bonding sufficient to maintain a pair of glass substrates (for example a glass carrier and a thin glass sheet) bonded to one another through the rigors of FPD processing but also of a degree that (even after high temperature processing of, e.g. ≥400° C. to 700° C.) allows the detachment of the first sheet (e.g., a thin sheet) from the second sheet (e.g. a carrier) after processing is complete. Moreover, the detachment of the first sheet from the second sheet can be performed by mechanical forces, and in such a manner that there is no significant damage to at least the first sheet, and preferably also so that there is no significant damage to the second sheet.

An appropriate bonding energy can be achieved by using select surface modifiers, i.e., coating layer, and/or thermal or nitrogen treatment of the surfaces prior to bonding. The appropriate bonding energy may be attained by the choice of chemical modifiers of either one or both of bonding surface 14 and bonding surface 24, which chemical modifiers control both the van der Waal (and/or hydrogen bonding, as these terms are used interchangeably throughout the specification) adhesion energy as well as the likely covalent bonding adhesion energy resulting from high temperature processing (e.g., on the order of ≥400° C. to 700° C.).

The bonding energy of the modification layers to thin sheets, e.g., thin glass sheets, was tested after specific heating conditions. To see whether a particular surface modification layer would allow a thin sheet to remain bonded to a carrier and still allow the thin sheet to be debonded from the carrier after processing, the following test was carried out. The article (thin sheet bonded to the carrier via the surface modification layer) was put in a furnace that ramped to the desired processing-test temperature at a rate of 4° C. per second. The article was then held in the furnace (maintained at the desired processing-test temperature) for 10 minutes. The furnace was then cooled to about 150° C. within 45 minutes, and the sample was pulled. The article was then tested for bond energy according to the Bond Energy test set forth herein.

Production of the Glass Article

In order to produce the glass article, the coating layer is introduced to one of the glass sheets, preferably the second sheet. If desired, the coating layer can be subjected to steps such as surface activation and annealing in order increase the surface energy and improve the bonding capabilities of the coating layer. In order to bond the other sheet, which is preferably the first sheet, the other sheet is brought into contact with the coating layer. If the coating layer has a high enough surface energy, introducing the other glass sheet to the coating layer will result in the glass sheet being bonded to the coating layer via a self-propagating bond. Self-propagating bonds are advantageous in reducing assembly time and/or cost. However, if a self-propagating bond does not result, the thin glass sheet can be bonded to the coating layer using additional techniques, such as lamination, for example by pressing the sheets together with rollers, or by other techniques, as known in the lamination art for bringing two pieces of material together for bonding.

Outgassing of the Coating Layer

Polymer adhesives used in typical wafer bonding applications are generally 10-100 μm thick and lose about 5% of their mass at or near their temperature limit. For such materials, evolved from thick polymer films, it is easy to quantify the amount of mass loss, or outgassing, by mass-spectrometry. On the other hand, it is more challenging to measure the outgassing from thin surface treatments that are on the order of 10 to 100 nm thick or less, for example the plasma-polymerized coating layers described above, as well as for a thin layer of pyrolyzed silicone oil. For such materials, mass-spectrometry is not sensitive enough. There are a number of other ways to measure outgassing, however.

Outgassing according to the present disclosure is measured by the following OUTGASSING TEST. According to this test measuring small amounts of outgassing is based on an assembled article, i.e., one in which a thin glass sheet is bonded to a glass carrier via a coating layer to be tested, and uses a change in percent blister area to determine outgassing. During heating of the glass article, blisters formed between the carrier and the thin sheet that indicate outgassing of the coating layer. The outgassing under the thin sheet may be limited by strong adhesion between the thin sheet and carrier. Nonetheless, layers ≤10 nm thick (plasma-polymerized materials, self-assembled monolayers (SAMs), and pyrolyzed silicone oil surface treatments, for example) may still create blisters during thermal treatment, despite their smaller absolute mass loss. And the creation of blisters between the thin sheet and carrier may cause problems with pattern generation, photolithography processing, and/or alignment during device processing onto the thin sheet. Additionally, bubbling at the boundary of the bonded area between the thin sheet and the carrier may cause problems with process fluids from one process contaminating a downstream process. A change in % blister area of ≥5 is significant, indicative of outgassing, and is not desirable. On the other hand a change in % blister area of ≤1 is insignificant and an indication that there has been no outgassing.

The average blister area of bonded thin glass in a class 1000 clean room with manual bonding is about 1%. The % blisters in bonded carriers is a function of cleanliness of the carrier, thin glass sheet, and surface preparation. Because these initial defects act as nucleation sites for blister growth after heat treatment, any change in blister area upon heat treatment less than 1% is within the variability of sample preparation. To carry out this test, a commercially available desktop scanner with transparency unit (Epson Expression 10000XL Photo) was used to make a first scan image of the area bonding the thin sheet and carrier immediately after bonding. The parts were scanned using the standard Epson software using 508 dpi (50 µm/pixel) and 24 bit RGB. The image processing software first prepares an image by stitching, as necessary, images of different sections of a sample into a single image and removing scanner artifacts (by using a calibration reference scan performed without a sample in the scanner). The bonded area is then analyzed using standard image processing techniques, for example thresholding, hole filling, erosion/dilation, and blob analysis. Instead of an Epson Expression 10000XL Photo printer, an Epson Expression 11000XL Photo may also be used in a similar manner. In transmission mode, blisters in the bonding area are visible in the scanned image and a value for blister area can be determined. Then, the blister area is compared to the total bonding area (i.e., the total overlap area between the thin sheet and the carrier) to calculate a % area of the blisters in the bonding area relative to the total bonding area. The samples are then heat treated in a MPT-RTP600 s Rapid Thermal Processing system, available from Modular Process Technology (MPT, with offices in San Jose, Calif.) under $N_2$ atmosphere at test-limit temperatures of 300° C., 400° C., 500° C. and 600° C., for up to 10 minutes. Specifically, the time-temperature cycle carried out included: inserting the article into the heating chamber at room temperature and atmospheric pressure; the chamber was then heated to the test-limit temperature at a rate of 9° C. per minute; the chamber was held at the test-limit temperature for 10 minutes; the chamber was then cooled at furnace rate to 200° C.; the article was removed from the chamber and allowed to cool to room temperature; the article was then scanned a second time with the optical scanner. The % blister area from the second scan was then calculated as above and compared with the % blister area from the first scan to determine a change in % blister area. As noted above, a change in blister area of ≥5% is significant and an indication of outgassing. A change in % blister area was selected as the measurement criterion because of the variability in original % blister area. That is, most coating layers have a blister area of about 2% in the first scan due to handling and cleanliness after the thin sheet and carrier have been prepared and before they are bonded. However, variations may occur between materials.

The % blister area measured, as exemplified by the change in percent blister area, can also be characterized as the percent of total surface area of the coating layer bonding surface not in contact with the first sheet bonding surface. As described above, the percent of total surface area of the coating layer bonding surface not in contact with the first sheet is desirably less than 5%, less than 3%, less than 1% and up to less than 0.5% after the glass article is subjected to a temperature cycle by heating in a chamber cycled from room temperature to 500° C., 600° C., 650° C., and up to 700° C. at a rate in the range of from about 400 to about 600° C. per minute and then held at the test temperature for 10 minutes before allowing the glass article to cool to room temperature. The coating layer described herein allows the first sheet to be separated from the second sheet without breaking the first sheet into two or more pieces after the glass article is subjected to the above temperature cycling and thermal testing.

Processing of the Glass Article

The use of a coating layer, together with bonding surface preparation as appropriate, can achieve a controlled bonding area, that is, a bonding area capable of providing a room-temperature bond between the first sheet and the second sheet sufficient to allow the article to be processed in FPD type processes (including vacuum and wet processes), and yet one that controls covalent bonding between the first sheet and the second sheet (even at elevated temperatures) so as to allow the first sheet to be removed from the second sheet (without damage to the sheets) after high temperature processing of the article, for example, FPD type processing or LTPS processing. To evaluate potential bonding surface preparations and coating layers with various bonding energies that would provide a reusable carrier suitable for FPD processing, a series of tests were used to evaluate the suitability of each. Different FPD applications have different requirements, but LTPS and Oxide TFT processes appear to be the most stringent at this time. Thus, tests representative of steps in these processes were chosen, as these are desired applications for the article 2. Annealing at 400° C. is used in oxide TFT processes, whereas crystallization and dopant activation steps over 600° C. are used in LTPS processing. Accordingly, the following testing was carried out to evaluate the likelihood that a particular bonding surface preparation and the coating layer would allow a thin sheet to remain bonded to a carrier throughout FPD processing, while allowing the thin sheet to be removed from the carrier (without damaging the thin sheet and/or the carrier) after such processing (including processing at temperatures ≥400° C. to 700° C.).

EXAMPLES

Example 1

A diphenylsilicone plasma polymer coating layer (also known as poly(diphenyl-siloxane)) was deposited on a 0.7 mm carrier (made from Corning® EAGLE XG® alkali-free display glass, available from Corning Incorporated, Corning, N.Y.) under a low pressure plasma discharge from oxygen and dimethoxydiphenylsilane. The deposition was carried out in a Plasma-Treat PTS 150 system (a low pressure hot wall CVD reactor available from Plasmatreat USA Inc. Belmont Calif.) with the walls heated to 150° C., with a chamber pressure 50 mTorr (mT) from flowing 0.1 millilitres per minute (mL/min) of dimethoxydiphenylsilane into a vaporizer at 150° C., 40 standard cubic centimeters per minute (sccm) $O_2$, with two RF powered electrodes applied with a bias of 25-50 Watts (W) at a frequency of 13.56 MHz RF. In this system, RF drives a pair of electrodes in the chamber and the substrates sit at floating potential in the discharge between the electrodes.

Comparative Example 1

A phenylsilicone plasma polymer coating layer (also known as poly(phenylsiloxane)) was deposited on a carrier (made from 0.7 mm thick Corning® EAGLE XG® alkali-free display glass) under a low pressure plasma discharge from oxygen and phenyltriethoxysilane. The deposition was carried out in a Plasma-Treat PTS 150 system at 150° C., 50 mT from 0.1 ml/min of phenyl-triethoxysilane, 40 sccm $O_2$ flow, and 25-50 Watts bias at a frequency 13.56 MHz RF.

Testing of Example 1 and Comparative Example 1

Coating Layer Thermal Stability

Figure 3:
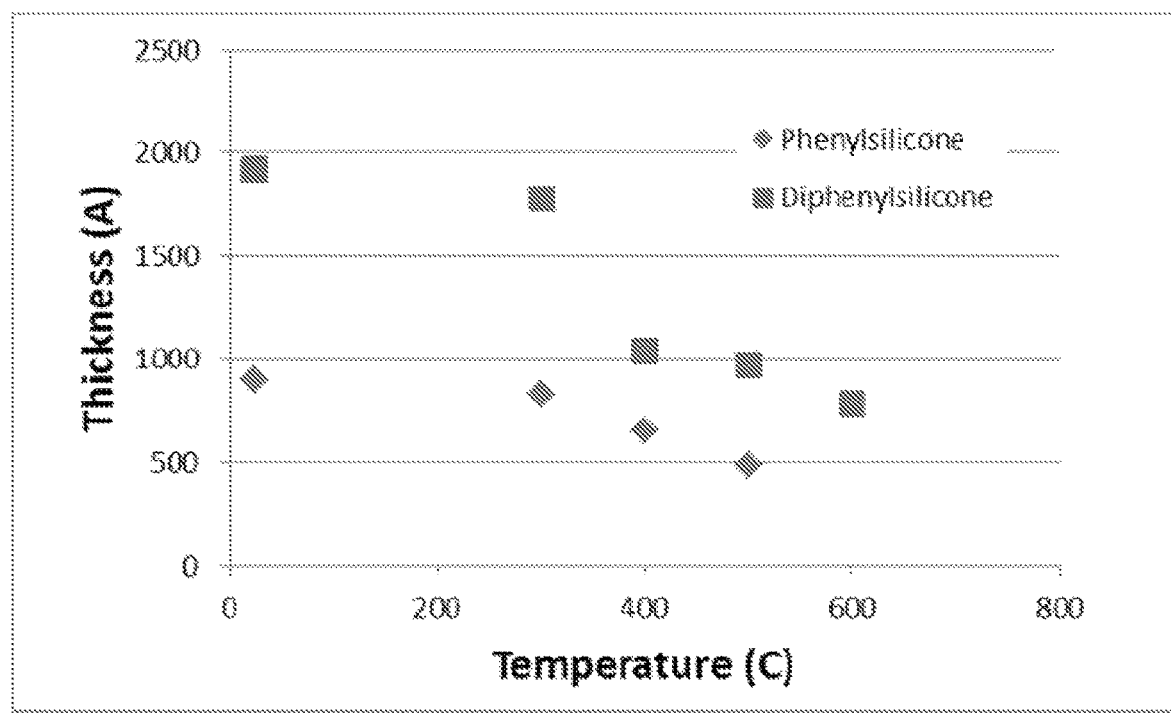
FIG. 3 is a graph of the thickness of plasma-polymerized phenylsilicone and diphenylsilicone coating layers as deposited and upon being subjected to processing.

The thermal stability of plasma-polymerized phenylsilicone and diphenylsilicone coating layers, as demonstrated by plotting the thickness of the coating layer vs. 10 minutes of processing in flowing nitrogen at the indicated temperature, is shown in FIG. 3. From FIG. 3, it is seen that as processing temperatures move above 300° C., plasma-polymerized phenylsilicone and diphenylsilicone are not very thermally stable as deposited. Specifically, both materials exhibited significant film thickness loss upon ten minutes of heating in flowing nitrogen at temperatures above 300° C., particularly at 400° C. and above.

Coating Layer Quality

Figure 4:
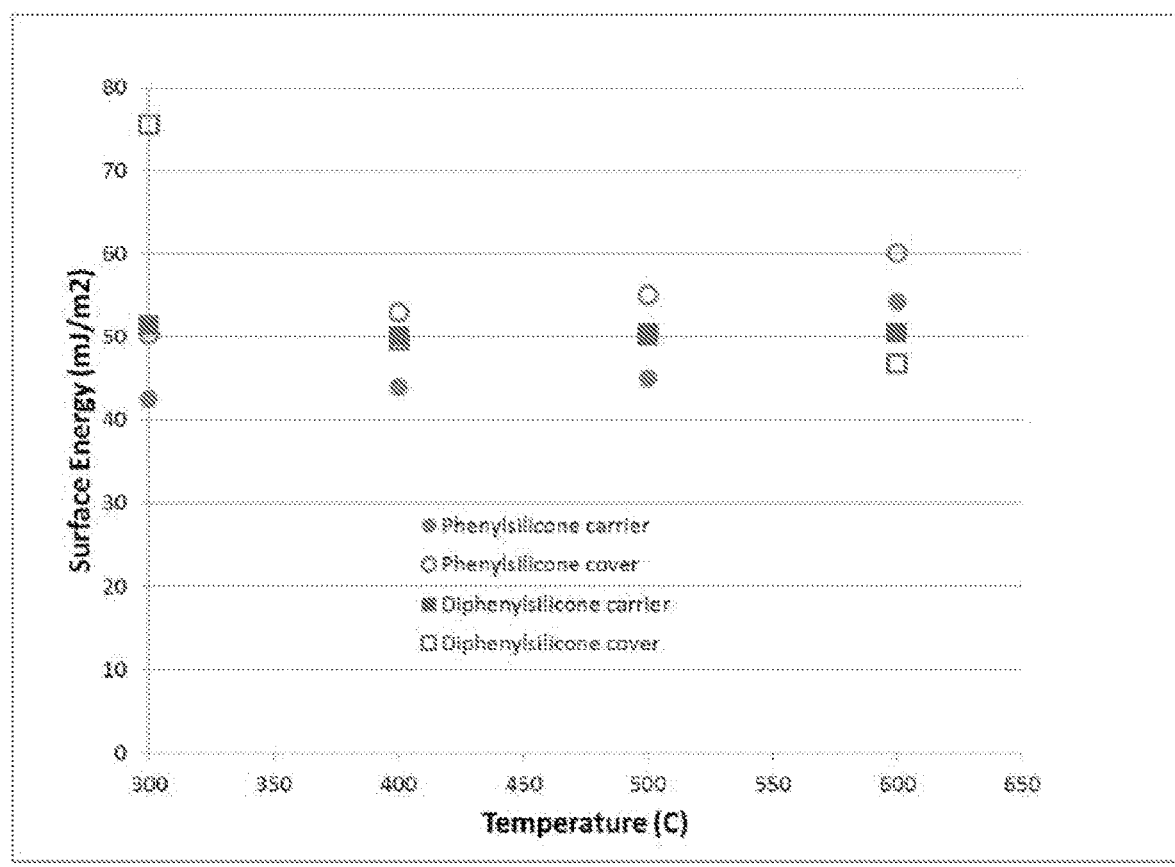
FIG. 4 is a graph of the surface energy of plasma-polymerized phenylsilicone and diphenylsilicone coating layers on a carrier and corresponding cover wafers.

The thermal instability leads to a significant amount of outgassing as shown in FIG. 4, which is a plot the surface energy of coated carriers and cover wafers vs. 10 minutes of processing in flowing nitrogen at the indicated temperature, as discussed in Test #1. Specifically, according to Test #1, outgassing is shown by a change in surface energy of greater than 10 $mJ/m^2$, whereas a change in surface energy of less than 5 $mJ/m^2$ is consistent with no outgassing. Although not shown in the graph, the surface energy of each the phenylsilicone cover and the diphenylsilicone cover were at about 75 $mJ/m^2$ at room temperature (about 16° C.), i.e., that of bare glass. As seen in FIG. 4, the phenylsilicone cover (open circle data points) experienced a change in surface energy of greater than 10 $mJ/m^2$ as the processing temperature moves from room temperature (about 16° C.) to 300° C. and to 600° C. The decrease in surface energy of the phenylsilicone cover from about 75 $mJ/m^2$ at room temperature to about 50 $mJ/m^2$ at 300° C. is consistent with material coming off of the carrier and being deposited on the cover. The increase in surface energy of the phenylsilicone cover from 300° C. to 600° C. is consistent with the material previously deposited on the cover (that came off of the carrier) being burning off at those higher temperatures. Similarly, the diphenylsilicone cover (open square data points) also showed a change in surface energy of greater than 10 $mJ/m^2$ as processing temperatures move from 300° C. to 600° C. However, moving from room temperature to 300° C., the surface energy of the diphenylsilicone cover (open square data points) remained about the same at 75 $mJ/m^2$. Thus, at temperatures at least up to 300° C. and lower than 400° C., diphenylsilicone can be used as deposited with little or no outgassing.

Surface Activation

Surfaces of the plasma-polymerized phenylsilicone and diphenylsilicone were readily modified by plasma exposure to nitrogen, or to nitrogen and oxygen mixtures as shown in Table 1. This plasma activation raised the surface energy of the coatings from 40 $mJ/m^2$ for phenylsilicone to nearly that of bare glass with $N_2$—$O_2$ mixtures. This surface modification was performed in an Oxford PlasmaLab 100 but could have been done by low pressure or atmospheric discharge. The plasma treatment can be performed with two sequential steps. Specifically, treatment with a hydrogen plasma (30 seconds (s), 10 sccm flow of $C_2H_4$, 50 sccm flow of $H_2$ with the chamber at a pressure of 5 mT, the coil at 1500 W, with a 50 W RF bias at a frequency of 13.56 MHz) is immediately followed by either an $N_2$ plasma treatment (5 mT chamber pressure, 40 sccm flow of N2, the coil at 1500 W, with a 50 W bias frequency of 13.56 MHz, for 5 s), or by an $N_2$—$O_2$ plasma treatment (5 s, 35 sccm flow of $N_2$, 5 sccm flow of $O_2$, chamber pressure of 15 mT, the coil at 800 W, with a bias of 50 W RF frequency of 13.56 MHz) without extinguishing the plasma. By raising the surface energy to nearly that of bare glass, the thin glass sheet was room-temperature bonded to the carrier with a fast self-propagating bond.

Table 1 shows the contact angle (for water "W", hexadecane "HD" and diiodomethane "DIM") and surface energy (dispersion component "D", polar component "P", and total "T", as measured by the Wu model (discussed above), of phenylsilicone and diphenylsilicone layers. Particularly, Table 1 shows the contact angles and surface energies for bare carriers, coated but untreated carriers, and coated layers treated with nitrogen, or with nitrogen and oxygen. Thus, for example, the first row of Table 1 indicates that the bare carrier had a W contact angle of 8.37, a HD contact angle of 19.67, a DIM contact angle of 24.67, and a total surface energy of 75.92 $mJ/m^2$ of which the dispersion component accounted for 34.56 $mJ/m^2$ and the polar component accounted for 41.36 $mJ/m^2$. Similarly, the second row of Table 1 indicates that the carrier coated with phenylsilicone but untreated had a W contact angle of 81.63, a HD contact angle of 2.83, a DIM contact angle of 53.2, and a total surface energy of 40.09 $mJ/m^2$ of which the dispersion component accounted for 30.36 $mJ/m^2$ and the polar component accounted for 9.73 $mJ/m^2$.

TABLE 1

|  | W | HD | DIM | D | P | T |
|---|---|---|---|---|---|---|
| Phenylsilicone |  |  |  |  |  |  |
| Bare | 8.37 | 19.67 | 24.67 | 34.56 | 41.36 | 75.92 |
| Coated-Untreated | 81.63 | 2.83 | 53.2 | 30.36 | 9.73 | 40.09 |
| $N_2$ treated | 42 | 17.83 | 36.77 | 32.84 | 29.33 | 62.17 |
| $N_2$—$O_2$ treated | 5.57 | 24.67 | 45.57 | 30.45 | 43.97 | 74.42 |
| Diphenylsilicone |  |  |  |  |  |  |
| Bare | 2.33 | 24.5 | 38.53 | 31.8 | 43.43 | 75.23 |
| Coated-Untreated | 48.17 | 10.63 | 35.33 | 33.65 | 25.73 | 59.38 |
| $N_2$ treated | 33.07 | 19.27 | 28.97 | 33.99 | 33.39 | 67.38 |
| $N_2$—$O_2$ treated | 8.8 | 25.37 | 41.33 | 31.17 | 43.1 | 74.27 |

Bond Quality

Figure 5:
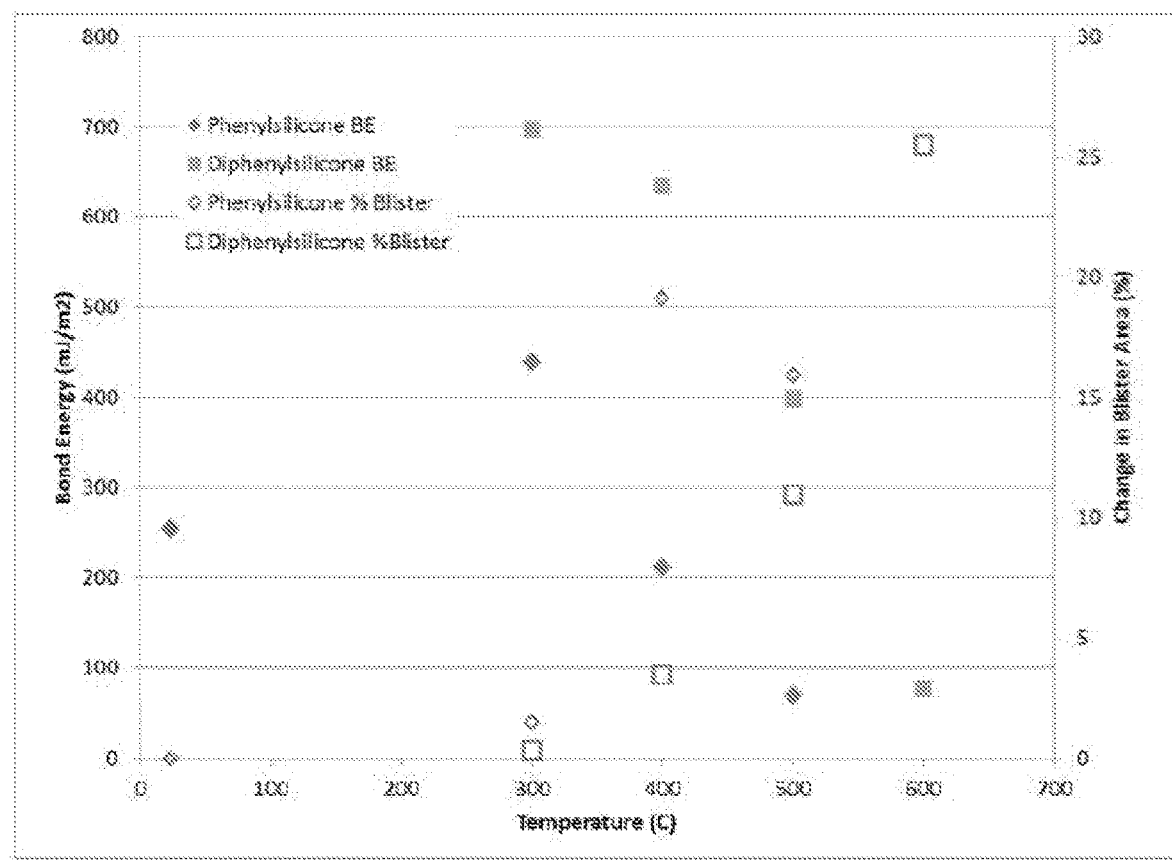
FIG. 5 is a graph of the bond energy and change in percent blister area for thin glass bonded to carriers with $N_2$—$O_2$ plasma-treated, plasma-polymerized phenylsilicone and diphenylsilicone coating layers.

After the surface energy of coating layer was raised to nearly that of bare glass, for example by $N_2$—$O_2$ treatment of the coated carrier, 100 µm thin glass sheets (made of Corning® Willow® Glass, available from Corning Incorporated, Corning, N.Y.) were bonded thereto. The quality of the bonds between the coating layers and the thin glass sheets, as demonstrated by the bond energy and change in blister area of thin glass sheets bonded to plasma-polymerized phenylsilicone and diphenylsilicone coating layers on carriers after 10 minutes of processing using an MPT-RTP600 s Rapid Thermal Processing system in flowing nitrogen at the indicated temperature, are shown in FIG. 5. As can be seen, as the bond energy decreases, the blister area increases, indicating that the percent of the surface of the thin glass sheet bonded to the coating layer is decreasing. More specifically, for phenylsilicone, the change in % blister area (according to TEST #2, above, and shown by open diamond data points) increases well above 5% as the sample is heated at temperatures above 300° C., for example heated at 400° C. (change in blister area of almost 20%), or at 500° C.

(change in blister area above 15%). Accordingly, this material is useful up to a temperature of about 300° C. Similarly, for diphenylsilicone, the change in % blister area (according to TEST #2, above, and as shown by open square data points) increases well above 5% as the sample is heated above 400° C., for example, heated at 500° C. (change in blister area of over 10%), or heated at 600° C. (change in blister area of about 25%). Accordingly, this material is useful up to a temperature of about 400° C.

Annealing

Figure 6:
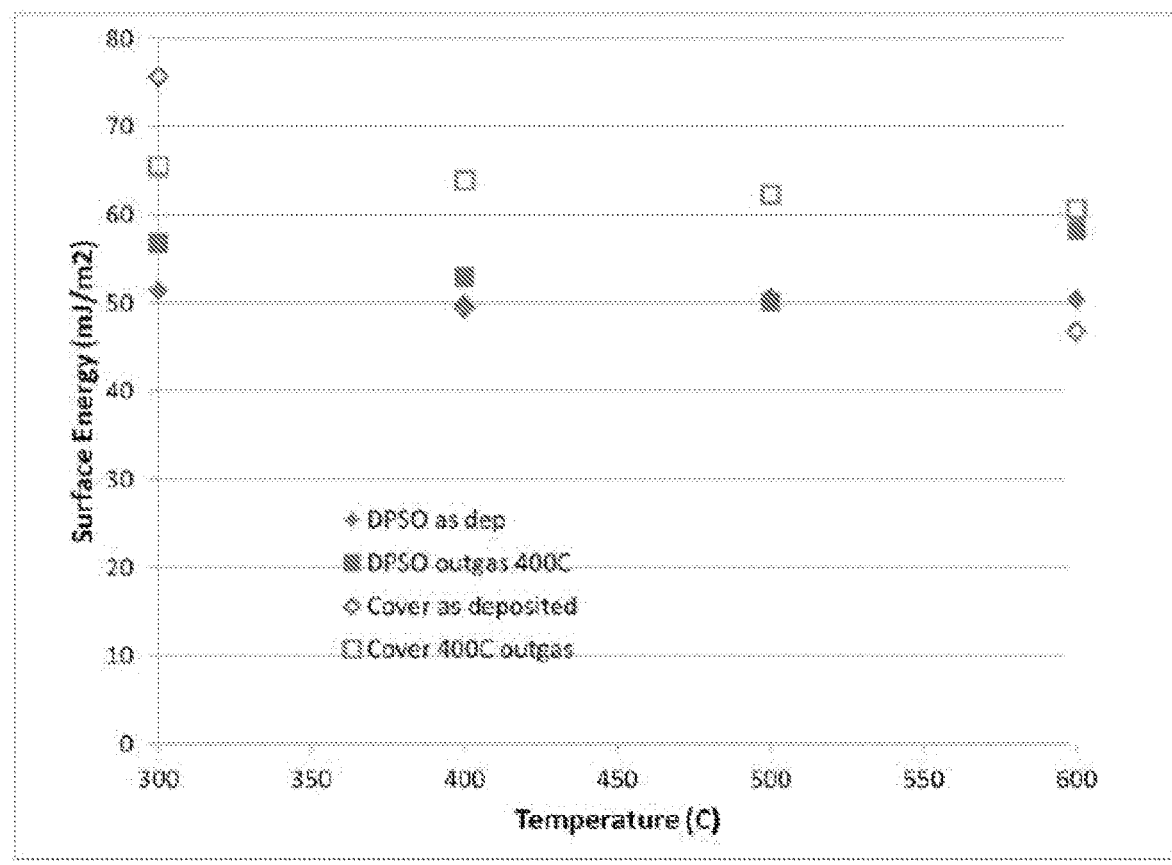
FIG. 6 is a graph of the surface energy of plasma-polymerized diphenylsilicone coating layer on a carrier and corresponding cover wafers measured as deposited and after being annealed for 10 minutes in flowing nitrogen.

To reduce outgassing, the coated carriers, prior to any surface activation of the surface modification layer, were subjected to annealing for 10 minutes at 400° C. in flowing nitrogen prior to any measuring and prior to bonding with thin sheets. FIG. 6 shows a comparison of the outgassing (according to TEST #1) of a diphenylsilicone ("DPSO") coating layer with and without the initial annealing step. More specifically, FIG. 6 shows the surface energy of coated carriers and the surface energy of cover wafers after 10 minutes of heating in flowing nitrogen at the indicated temperature. The measurements taken with the initial annealing step are labeled "400 C outgas" or "outgas 400 C" and the measurements taken without the initial annealing step are labeled "as dep" or "as deposited" for as deposited. Thus, as shown in FIG. 6: the surface energy of DPSO as deposited on a carrier remains about constant at around 50 mJ/m$^2$ as the carrier is heated at a temperature ranging from 300° C. to about 600° C., see the filled diamond data points; the surface energy of a cover wafer (according to TEST #1), disposed above a carrier having the DPSO as deposited, reduces from about 75 mJ/m$^2$ after having been heated at 300° C. to about 50 mJ/m$^2$ after having been heated at 400° C. and above, see the open diamond data points; the surface energy of DPSO as deposited on a carrier and then subject to an initial annealing step of heating at 400° C. for 10 minutes has a surface energy of about 55 mJ/m$^2$ after having been heated at 300° C., has a surface energy of about 50 mJ/m$^2$ after having been heated at 400° C. to about 500° C., and a surface energy of about 60 mJ/m$^2$ after having been heated at 600° C., see the filled square data points; and the surface energy of a cover wafer (according to TEST #1), disposed above a carrier having the DPSO deposited and then annealed at 400° C. for 10 minutes, changes from about 65 mJ/m$^2$ after having been heated at 300° C. to about 60 mJ/m$^2$ after having been heated at 600° C., see the open square data points. Thus, as shown by the open square data points, the change in surface energy of the cover wafer above the annealed DPSO changes less than 5 mJ/m$^2$ over the range of 300° C. to 600° C., which is consistent with no outgassing as per TEST #1.

Bond Quality After Annealing

Figure 7:
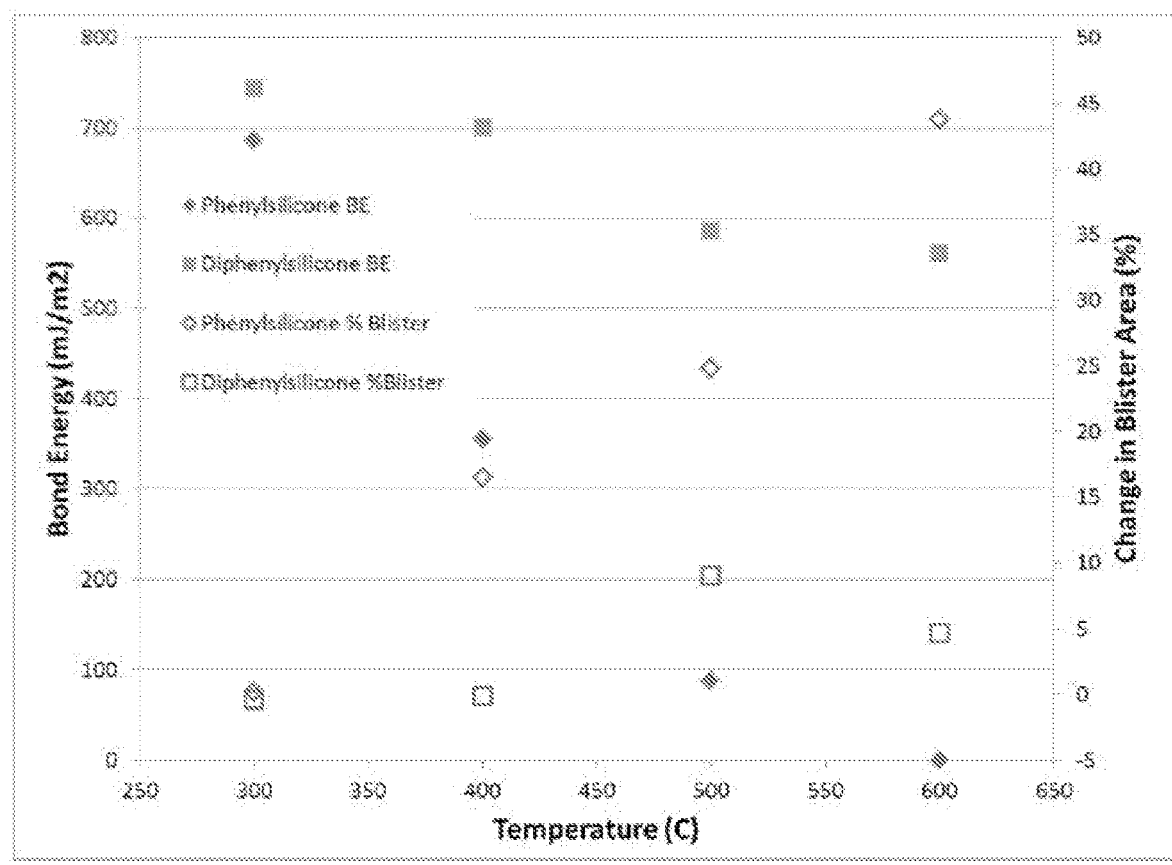
FIG. 7 is a graph of the bond energy and change in percent blister area for thin glass bonded to carriers with $N_2$—$O_2$ plasma-treated, plasma-polymerized phenylsilicone and diphenylsilicone after being annealed for 10 minutes in flowing nitrogen prior to surface activation and bonding.

FIG. 7 shows the bond energy and change in % blister area (according to TEST #2) for samples that have been subject to an initial annealing step at 400° C. for 10 minutes in flowing nitrogen prior to the measurements depicted. That is, 0.7 mm EAGLE XG® carriers were coated with either plasma-polymerized phenylsilicone or plasma-polymerized diphenylsilicone, then subject to heating at 400° C. for 10 minutes in flowing nitrogen, then the coated carriers were surface activated with $N_2$—$O_2$ plasma to raise the surface energy to nearly that of bare glass prior to being bonded to 100 µm Willow® Glass thin glass sheets to form a test article. The test articles were then subject to processing in an MPT-RTP600 s Rapid Thermal Processing system at the indicated temperature for 10 minutes in flowing nitrogen. The measurements in FIG. 7 show: the bond energy for the phenylsilicone bonded test articles decreases rapidly, that is, from about 700 mJ/m$^2$ when heated at 300° C. to about 0 mJ/m$^2$ when heated at 600° C., see the filled diamond data points; the change in percent blister area for the phenyl silicone bonded test articles remains below 5% when heated at 300° C., but rapidly rises above 10% (indicative of outgassing) as the articles were heated at temperatures of 400° C. and above, see the open diamond data points; the bond energy for diphenylsilicone bonded test articles remains in the range of from about 750 mJ/m$^2$ to about 550 mJ/m$^2$ when heated at a temperature in the range of about 300° C. to about 600° C., and the thin glass sheet remains debondable from the carrier, see the filled square data points; the change in percent blister area for the diphenylsilicone bonded test articles remains below 10% when heated at temperatures in the range of from 300° C. to 600° C., see the open square data points. Although there was some outgassing for the diphenylsilicone bonded test articles, particularly around 500° C., the samples still remained intact through the testing, and were debondable even after having been heated at 600° C., indicating that the diphenylsilicone as prepared for these test articles would be useful over a wide range of temperatures, including those up to at least 600° C., i.e., for LTPS processing. On the other hand, the phenylsilicone as prepared for the test articles of FIG. 7 would be useful for processing devices that require temperatures up to 300° C., for example, color filters or touch sensors.

Example 2

In two separate runs, plasma-polymerized hexamethyldisiloxane (HMDSO) coating layers were deposited on 0.7 mm EAGLE XG® carriers in a dielectric barrier discharge (DBD) type linear atmospheric plasma at room temperature or 100° C. (using power between about 100 and 200 Watts, frequency of 13.56 MHz, using He as a carrier gas to bring out the HMDSO with a flow rate of about 30 or about 50 sccm, an $O_2$ flow rate of 0-10 sccm, and extra He as main gas, room temperature or 100° C. deposition, plasma head and substrate distance around 2 mm). The HMDSO and $O_2$ flow rates in deposition for the two separate runs, as well as the surface energy and roughness as measured by Atomic Force Microscope (AFM), are shown in Table 3. The coated carriers were then bonded to clean 100 µm thin glass sheets (made of Corning® Willow® glass) and subjected to 600° C. for 10 min in an RTP in $N_2$ ambient. The deposition conditions, surface energy, bond energy and the change in blister area, are also shown in Table 3. The thin glass could be readily debonded from the treated substrate after the 600° C. processing, note the bond energy of only 364 mJ/m$^2$. The 8-9% change in percent blister area after heating at 600° C. is consistent with some, but minimal, outgassing. It is instructive to note that Example 2 was not carried out in a clean room, whereby the carriers, thin glass sheets, and coating layers were subject to particulate contamination during processing. It is believed that if this example was performed in a clean room, with reduced contamination to the carriers, thin glass sheets, and/or coating layers, there would have been an even smaller change in blister area because there of increased barriers to nucleation provided by a better bond quality between the thin glass sheets and carriers.

TABLE 2

| HMDSO (sccm) | O$_2$ (sccm) | Dep. Temp | Scans | D | P | T | AFM Ra (nm) | 600° C. Δ% Blister Area | 600° C. Bond Energy (mJ/m$^2$) |
|---|---|---|---|---|---|---|---|---|---|
| 30 | 10 | 23° C. | 1 | 28.67 | 16.27 | 44.94 | 0.34 | 7.98 | 364.11 |
| 50 | 10 | 100° C. | 1 | 31.81 | 19.91 | 51.71 | 0.38 | 9.08 | 360.81 |

It will be apparent to those skilled in the art that various modifications and variations can be made to the embodiments disclosed herein without departing from the spirit and scope of the claimed subject matter. Many variations and modifications may be made to the above-described embodiments without departing substantially from the spirit and various principles described. All such modifications and variations are intended to be included herein within the scope of this disclosure and protected by the following claims. For example, non-limiting embodiments include the following.

Embodiment 1

An article comprising:
a first sheet comprising a first sheet bonding surface;
a second sheet comprising a second sheet bonding surface; and
a coating layer comprising a first coating layer bonding surface and a second coating layer bonding surface, the coating layer comprising a plasma-polymerized organosiloxane compound;
the first coating layer bonding surface is bonded with the first sheet bonding surface, and the second coating layer bonding surface is bonded with the second sheet bonding surface.

Embodiment 2

The article of embodiment 1, the plasma-polymerized organosiloxane compound formed by depositing a monomer on at least one of the first sheet bonding surface and the second sheet bonding surface.

Embodiment 3

The article of embodiment 2, the monomer comprising a compound of formula $(R^1)_m Si(X^1)_n$, wherein each $R^1$ is independently an aryl, alkyl, alkenyl, alkynyl, or a combination thereof; m is 1, 2 or 3; each $X^1$ is independently hydrogen, halogen, hydroxy, alkoxy, amino, aryl, alkyl, alkenyl, alkynyl, or a combination thereof; and n is 1, 2 or 3.

Embodiment 4

The article of embodiment 3, $R^1$ being aryl and/or $X^1$ being alkoxy.

Embodiment 5

The article of embodiment 3, wherein the monomer is at least one monomer selected from the group consisting of phenyltrimethoxysilane, phenyltriethoxysilane, phenyltribromosilane, phenyltrichlorosilane, dimethoxydiphenylsilane, diethoxydiphenylsilane, dibromodiphenylsilane, dichlorodiphenylsilane, bis(dimethylamino)diphenylsilane, bis(diethylamino)diphenylsilane, phenylsilane, and diphenylsilane.

Embodiment 6

The article of embodiment 2, the monomer comprising a disiloxane compound having the structure below, wherein each of $R^2$-$R^7$ is independently hydrogen, halogen, hydroxy, alkoxy, amino, aryl, alkyl, alkenyl, alkynyl, or a combination thereof.

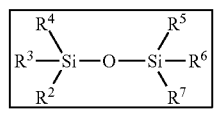

Embodiment 7

The article of embodiment 6, wherein the monomer is hexamethyldisiloxane.

Embodiment 8

The article of embodiment 1, the coating layer comprising poly(diphenylsiloxane).

Embodiment 9

The article of any one of embodiments 1-8, the first coating layer bonding surface having a surface energy between 40 and 75 mJ/m$^2$.

Embodiment 10

The article of any one of embodiments 1-9, the coating layer having a thickness of less than 100 nm.

Embodiment 11

The article of any one of embodiments 1-10, the coating layer being comprised of a bottom coating layer and a top coating layer, the bottom coating layer being between the top coating layer and the second sheet, the bottom coating layer having a thickness between 10 and 80 nm and the top coating layer having a thickness between 10 and 50 nm.

Embodiment 12

The article of any one of embodiments 1-11, the first coating layer bonding surface being bonded with the first sheet bonding surface with a bond energy of less than 700 mJ/m$^2$ after subjecting the article to a temperature of 600° C. for 10 minutes in a nitrogen atmosphere.

Embodiment 13

The article of any one of embodiments 1-12, wherein the change in percent blister area is less than 10 when the article is subjected to a temperature of 600° C. for 10 minutes in a nitrogen atmosphere.

Embodiment 14

A method of making an article comprising:
    forming a coating layer comprising a plasma-polymerized organosiloxane compound on a bonding surface of a second sheet by depositing a monomer on the bonding surface of the second sheet using plasma CVD, the coating layer comprising a coating layer bonding surface; and
    bonding the coating layer bonding surface to a bonding surface of a first sheet.

Embodiment 15

The method of embodiment 14, further comprising exposing the bonding surface to oxygen, nitrogen, or a combination thereof, to increase the surface energy of the coating layer bonding surface before the bonding surface of the first sheet is bonded to the coating layer bonding surface, the surface energy of the coating layer bonding surface being increased to between 40 and 75 mJ/m$^2$.

Embodiment 16

The method of embodiment 14, the monomer comprising a compound of formula $(R^1)_m Si(X^1)_n$, wherein each $R^1$ is independently an aryl, alkyl, alkenyl, alkynyl, or a combination thereof; m is 1, 2 or 3; each $X^1$ is independently, hydrogen, halogen, hydroxy, alkoxy, amino, aryl, alkyl, alkenyl, alkynyl, or a combination thereof; and n is 1, 2 or 3.

Embodiment 17

The method of embodiment 16, $R^1$ being aryl and/or $X^1$ being alkoxy.

Embodiment 18

The method of embodiment 16, wherein the monomer comprises at least one monomer selected from the group consisting of phenyltrimethoxysilane, phenyltriethoxysilane, phenyltribromosilane, phenyltrichlorosilane, dimethoxydiphenylsilane, diethoxydiphenylsilane, dibromodiphenylsilane, dichlorodiphenylsilane, bis(dimethylamino)diphenylsilane, bis(diethylamino)diphenylsilane, phenylsilane, and diphenylsilane.

Embodiment 19

The method of embodiment 14, the monomer comprising a disiloxane compound having the structure below, wherein each of $R^2$-$R^7$ is independently hydrogen, halogen, hydroxy, alkoxy, amino, aryl, alkyl, alkenyl, alkynyl, or a combination thereof

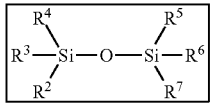

Embodiment 20

The method of embodiment 19, wherein the monomer is hexamethyldisiloxane.

Embodiment 21

The method of embodiment 14, the coating layer comprising poly(diphenylsiloxane).

Embodiment 22

The method of any one of embodiments 14-20, the coating layer having a thickness less than 100 nm.

Embodiment 23

The method of any one of embodiments 14-21, the coating layer being comprised of a bottom coating layer and a top coating layer, the bottom coating layer being between the top coating layer and the second sheet, the bottom coating layer having a thickness between 10 and 80 nm and the top coating layer having a thickness between 10 and 50 nm.

Embodiment 24

The method of any one of embodiments 14-22, further comprising subjecting the coating layer to thermal annealing, at a temperature of at least 300° C. in a nitrogen atmosphere, before the first sheet and the coating layer are bonded.

Embodiment 25

The method of embodiment 24, comprising subjecting the coating layer to thermal annealing at a temperature of at least 400° C.

Embodiment 26

An article comprising:
    a first sheet comprising a first sheet bonding surface;
    a second sheet comprising a second sheet bonding surface; and
    a coating layer comprising a first coating layer bonding surface and a second coating layer bonding surface, the coating layer comprising poly(diphenylsiloxane);
    the first coating layer bonding surface is bonded with the first sheet bonding surface, and the second coating layer bonding surface is bonded with the second sheet bonding surface.

Embodiment 27

The article of embodiment 26, the poly(diphenylsiloxane) coating layer formed by depositing a monomer on at least one of the first sheet bonding surface and the second sheet bonding surface, wherein the monomer is deposited on at least one of the first sheet bonding surface and the second sheet bonding surface, the monomer comprising a diphenylsilane compound having the structure below, wherein $X^2$ and $X^3$ are independently hydrogen, halogen, hydroxy, alkoxy, amino, aryl, alkyl, alkenyl, alkynyl, or a combination thereof.

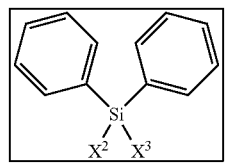

Embodiment 28

The article of embodiment 26, the first coating layer bonding surface having a surface energy between 40 and 75 mJ/m².

Embodiment 29

The article of any one of embodiments 26-28, the coating layer having thickness of less than 100 nm.

Embodiment 30

The article of any one of embodiments 26-29, wherein the coating layer comprises of a bottom coating layer and a top coating layer, and wherein the bottom coating layer is disposed between the top coating layer and the second sheet, the bottom coating layer having a thickness between 10 and 80 nm and the top coating layer having a thickness between 10 and 50 nm.

Embodiment 31

The article of any one of embodiments 26-30, the first coating layer bonding surface is bonded with the first sheet bonding surface with a bond energy of less than 700 mJ/m² after subjecting the article to a temperature of 600° C. for 10 minutes in a nitrogen atmosphere.

Embodiment 32

The article of any one of embodiments 26-31, wherein the change in percent blister area is less than 10 when the article is subjected to a temperature of 600° C. for 10 minutes in a nitrogen atmosphere.

Embodiment 33

A method of making an article comprising:
forming a coating layer comprising poly(diphenylsiloxane) on a bonding surface of a second sheet by depositing a monomer on the bonding surface of the second sheet, the coating layer comprising a coating layer bonding surface; and bonding the coating layer bonding surface to a bonding surface of a first sheet.

Embodiment 34

The method of embodiment 33, the monomer comprising a diphenylsilane compound having the structure below, wherein $X^2$ and $X^3$ are independently hydrogen, halogen, hydroxy, alkoxy, amino, aryl, alkyl, alkenyl, alkynyl, or a combination thereof

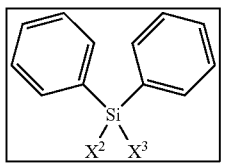

Embodiment 35

The method of embodiment 33 or embodiment 34, the coating layer having a thickness less than 100 nm.

Embodiment 36

The method of any one of embodiments 33-35, wherein the coating layer is comprised of a bottom coating layer and a top coating layer, the bottom coating layer being between the top coating layer and the second sheet, the bottom coating layer having a thickness between 10 and 80 nm and the top coating layer having a thickness between 10 and 50 nm.

Embodiment 37

The method of any one of embodiments 33-36, further comprising subjecting the coating layer to thermal annealing, at a temperature of at least 300° C. in a nitrogen atmosphere, before the first sheet and the coating layer are bonded, comprising subjecting the coating layer to thermal annealing.

Embodiment 38

The method of embodiment 37, comprising subjecting the coating layer to thermal annealing at a temperature of at least 400° C.

What is claimed is:

1. An article comprising:
   a first sheet comprising a first sheet bonding surface;
   a second sheet comprising a second sheet bonding surface; and
   a coating layer comprising a first coating layer bonding surface and a second coating layer bonding surface, the coating layer comprising a plasma-polymerized organosiloxane compound;
   the first coating layer bonding surface is bonded with the first sheet bonding surface, and the second coating layer bonding surface is bonded with the second sheet bonding surface.

2. The article of claim 1, the plasma-polymerized organosiloxane compound formed by depositing a monomer on at least one of the first sheet bonding surface and the second sheet bonding surface wherein the monomer comprises a compound of formula $(R^1)_m Si(X^1)$, wherein each $R^1$ is independently an aryl, alkyl, alkenyl, alkynyl, or a combination thereof; m is 1, 2 or 3; each $X^1$ is independently hydrogen, halogen, hydroxy, alkoxy, amino, aryl, alkyl, alkenyl, alkynyl, or a combination thereof; and n is 1, 2 or 3.

3. The article of claim 2, $R^1$ being aryl and/or $X^1$ being alkoxy.

4. The article of claim 2, wherein the monomer is at least one monomer selected from the group consisting of phenyltrimethoxysilane, phenyltriethoxysilane, phenyltribromosilane, phenyltrichlorosilane, dimethoxydiphenylsilane, diethoxydiphenylsilane, dibromodiphenylsilane, dichlorodiphenylsilane, bis(dimethylamino)diphenylsilane, bis(diethylamino)diphenylsilane, phenylsilane, and diphenylsilane.

5. The article of claim 2, the monomer comprising a disiloxane compound having the structure below, wherein each of $R^2$-$R^7$ is independently hydrogen, halogen, hydroxy, alkoxy, amino, aryl, alkyl, alkenyl, alkynyl, or a combination thereof.

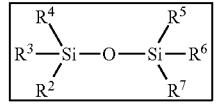

6. The article of claim 1, the coating layer comprising poly(diphenylsiloxane).

7. The article of claim 1, the first coating layer bonding surface having a surface energy between 40 and 75 mJ/m².

8. An article comprising:
a first sheet comprising a first sheet bonding surface;
a second sheet comprising a second sheet bonding surface; and
a coating layer comprising a first coating layer bonding surface and a second coating layer bonding surface, the coating layer comprising poly(diphenylsiloxane);
the first coating layer bonding surface is bonded with the first sheet bonding surface, and the second coating layer bonding surface is bonded with the second sheet bonding surface.

9. The article of claim 8, the poly(diphenylsiloxane) coating layer formed by depositing a monomer on at least one of the first sheet bonding surface and the second sheet bonding surface, wherein the monomer is deposited on at least one of the first sheet bonding surface and the second sheet bonding surface, the monomer comprising a diphenylsilane compound having the structure below, wherein $X^2$ and $X^3$ are independently hydrogen, halogen, hydroxy, alkoxy, amino, aryl, alkyl, alkenyl, alkynyl, or a combination thereof.

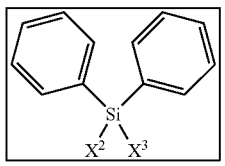

10. The article of claim 1, the coating layer having a thickness of less than 100 nm.

11. The article of claim 1, the coating layer being comprised of a bottom coating layer and a top coating layer, the bottom coating layer being between the top coating layer and the second sheet, the bottom coating layer having a thickness between 10 and 80 nm and the top coating layer having a thickness between 10 and 50 nm.

12. The article of claim 1, the first coating layer bonding surface being bonded with the first sheet bonding surface with a bond energy of less than 700 mJ/m² after subjecting the article to a temperature of 600° C. for 10 minutes in a nitrogen atmosphere.

13. The article of claim 1, wherein the change in percent blister area is less than 10 when the article is subjected to a temperature of 600° C. for 10 minutes in a nitrogen atmosphere.

14. The article of claim 8, the first coating layer bonding surface having a surface energy between 40 and 75 mJ/m².

15. The article of claim 8, the coating layer having thickness of less than 100 nm.

16. The article of claim 8, wherein the coating layer comprises of a bottom coating layer and a top coating layer, and wherein the bottom coating layer is disposed between the top coating layer and the second sheet, the bottom coating layer having a thickness between 10 and 80 nm and the top coating layer having a thickness between 10 and 50 nm.

17. The article of claim 8, the first coating layer bonding surface is bonded with the first sheet bonding surface with a bond energy of less than 700 mJ/m² after subjecting the article to a temperature of 600° C. for 10 minutes in a nitrogen atmosphere.

18. The article of claim 8, wherein the change in percent blister area is less than 10 when the article is subjected to a temperature of 600° C. for 10 minutes in a nitrogen atmosphere.

* * * * *

UNITED STATES PATENT AND TRADEMARK OFFICE
CERTIFICATE OF CORRECTION

PATENT NO. : 11,097,509 B2
APPLICATION NO. : 16/327497
DATED : August 24, 2021
INVENTOR(S) : Robert Alan Bellman et al.

Page 1 of 2

It is certified that error appears in the above-identified patent and that said Letters Patent is hereby corrected as shown below:

On the Title Page

On page 5, in Column 2, item (56), Other Publications, Line 8, delete "(1986." and insert -- (1986). --, therefor.

On page 5, in Column 2, item (56), Other Publications, Line 35, delete "(2002." and insert -- (2002). --, therefor.

On page 5, in Column 2, item (56), Other Publications, Line 50, delete "Cyloaddition";" and insert -- Cycloaddition"; --, therefor.

On page 5, in Column 2, item (56), Other Publications, Line 55, delete "Perfluororelastomer" and insert -- Perfluoroelastomer --, therefor.

On page 6, in Column 1, item (56), Other Publications, Line 9, delete "Depsoition:" and insert -- Deposition: --, therefor.

On page 6, in Column 1, item (56), Other Publications, Line 18, delete "(1971." and insert -- (1971). --, therefor.

On page 6, in Column 1, item (56), Other Publications, Line 29, delete ".Copyrgt." and insert -- .Copyright. --, therefor.

On page 6, in Column 1, item (56), Other Publications, Line 34, delete "Writien" and insert -- Written --, therefor.

On page 6, in Column 1, item (56), Other Publications, Line 37, delete "Writien" and insert -- Written --, therefor.

On page 6, in Column 1, item (56), Other Publications, Line 40, delete "Writien" and insert Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*

-- Written --, therefor.

On page 6, in Column 1, item (56), Other Publications, Line 44, delete "Aurthority;" and insert -- Authority; --, therefor.

On page 6, in Column 2, item (56), Other Publications, Line 14, delete "Aurthority;" and insert -- Authority; --, therefor.

On page 6, in Column 2, item (56), Other Publications, Line 30, delete "Irfrared" and insert -- Infrared --, therefor.

In the Claims

In Column 30, Line 40, Claim 2, delete "$(R^1)_m Si(X^1)$," and insert -- $(R^1)_m Si(X^1)_n$, --, therefor.